US006607041B2

(12) United States Patent
Suzuki et al.

(10) Patent No.: US 6,607,041 B2
(45) Date of Patent: Aug. 19, 2003

(54) POWER TOOLS

(75) Inventors: Hitoshi Suzuki, Anjo (JP); Masahiro Watanabe, Anjo (JP)

(73) Assignee: Makita Corporation, Anjo (JP)

( * ) Notice: Subject to any disclaimer, the term of this patent is extended or adjusted under 35 U.S.C. 154(b) by 0 days.

(21) Appl. No.: 09/811,370

(22) Filed: Mar. 16, 2001

(65) Prior Publication Data

US 2002/0050364 A1 May 2, 2002

(30) Foreign Application Priority Data

| | | |
|---|---|---|
| Mar. 16, 2000 | (JP) | 2000-074131 |
| Mar. 24, 2000 | (JP) | 2000-084140 |
| Apr. 12, 2000 | (JP) | 2000-111234 |
| Jun. 30, 2000 | (JP) | 2000-199999 |
| Jun. 30, 2000 | (JP) | 2000-200000 |

(51) Int. Cl.[7] .................................................. B23Q 15/28
(52) U.S. Cl. ............................ 173/4; 173/171; 173/11; 173/20; 702/33; 702/34; 702/35; 702/182; 702/183; 702/184
(58) Field of Search ................................ 173/4, 11, 20, 173/171; 702/9, 33, 34, 35, 36, 38, 41, 58, 59, 108, 113, 122, 123, 182, 183, 184, 185, 188

(56) References Cited

U.S. PATENT DOCUMENTS

| | | | | | |
|---|---|---|---|---|---|
| 3,882,305 | A | * | 5/1975 | Johnstone | 702/183 |
| 3,920,088 | A | * | 11/1975 | Dudek | 173/169 |
| 4,259,772 | A | | 4/1981 | Eshghy | 29/240 |
| 4,307,325 | A | * | 12/1981 | Saar | 318/472 |
| 4,317,176 | A | * | 2/1982 | Saar et al. | 318/245 |
| 4,410,846 | A | * | 10/1983 | Gerber et al. | 318/490 |
| 4,442,494 | A | * | 4/1984 | Fromson et al. | 702/34 |
| 4,513,381 | A | * | 4/1985 | Houser et al. | 318/571 |
| 4,536,688 | A | * | 8/1985 | Roger | 318/490 |
| 4,636,961 | A | * | 1/1987 | Bauer | 318/490 |
| 4,702,650 | A | | 10/1987 | Golwas et al. | 408/6 |
| 4,890,306 | A | | 12/1989 | Noda | 377/15 |
| 4,899,591 | A | * | 2/1990 | Kibblewhite | 29/594 |
| 5,277,261 | A | | 1/1994 | Sakoh | 173/176 |
| 5,289,885 | A | | 3/1994 | Sakoh | 173/2 |
| 5,737,433 | A | * | 4/1998 | Gardner | 381/71.1 |
| 5,898,379 | A | * | 4/1999 | Vanbergeijk | 702/183 |
| 5,903,462 | A | * | 5/1999 | Wagner et al. | 318/490 |
| 5,918,201 | A | | 6/1999 | Szwast et al. | 702/182 |
| 6,005,489 | A | | 12/1999 | Siegle et al. | 340/825.69 |
| 6,055,484 | A | * | 4/2000 | Lysaght | 173/181 |
| 6,191,554 | B1 | | 2/2001 | Nakane et al. | 320/114 |
| 6,311,786 | B1 | * | 11/2001 | Giardino et al. | 175/57 |
| 6,349,266 | B1 | * | 2/2002 | Lysaght et al. | 702/41 |
| 6,374,195 | B1 | * | 4/2002 | Li et al. | 702/182 |
| 6,394,221 | B2 | * | 5/2002 | Cosma | 181/106 |

FOREIGN PATENT DOCUMENTS

| | | | |
|---|---|---|---|
| EP | 0963026 | 8/1999 | H02J/7/00 |
| JP | 07-314344 | 12/1995 | B25B/21/02 |
| JP | 8-118251 | 5/1996 | B25B/23/142 |
| JP | 10-180643 | 7/1998 | B25B/21/02 |
| JP | 2983124 | 9/1999 | B25B/21/00 |
| JP | 2000-23377 | 1/2000 | H02J/7/00 |

* cited by examiner

*Primary Examiner*—Stephen F. Gerrity
*Assistant Examiner*—Gloria R Weeks
(74) *Attorney, Agent, or Firm*—Orrick, Herrington & Sutcliffe LLP

(57) ABSTRACT

Power tools are taught that may include, for example, means for detecting impact sounds generated, e.g. by a hammer strikes an anvil or by oil pulse from an oil unit. The detecting means may include a receiver (30) adapted to selectively convert sound within a narrow frequency range into electric signals. Preferably, the impact sounds fall within the narrow frequency range of the receiver (30). A processor 38 may be utilized to control the motor (22) in order to stop the rotation of the hammer when a pre-determined number of impact sounds has been detected by the detecting means. In addition or in the alternative, various means for setting various operating conditions are taught, including dials 34, sound sensors 30, keypads and remote control devices 250. Further, means for performing maintenance condition status checks are taught.

19 Claims, 28 Drawing Sheets

FIG.17

| | |
|---|---|
| $00 | register for mode setting |
| $01 | timer auto stop set value |
| $02 | impact count auto stop set value |
| $03~05 | switch operation times (3 byte) |
| $06~08 | set value for switch maintenance alarm (3 byte) |
| $09~0B | number of times battery has been removed (3 byte) |
| $0C~0E | set value for battery maintenance alarm (3 byte) |
| $0F~11 | motor usage (hours) (3 byte) |
| $12~14 | set value for motor maintenance alarm (3 byte) |
| $15~17 | gear usage (hours) (3 byte) |
| $18~1A | set value for gear maintenance alarm (3 byte) |
| $1B~1D | oil unit usage (hours) (3 byte) |
| $1E~20 | set value for oil unit maintenance alarm (3 byte) |
| $21~23 | model name |
| $24~26 | serial number |

POWER TOOLS

CROSS-REFERENCE

This application claims priority to Japanese application numbers 2000-74131, 2000-84140, 2000-111234, 2000-199999 and 2000-200000, each of which are incorporated herein by reference.

BACKGROUND OF THE INVENTION

1. Field of the Invention

The present invention relates to improved power tools.

2. Description of the Related Art

Japanese Laid-open Patent Publication Nos. 7-314344 and No. 10-180643 describe power tools that control the drive source (e.g. a motor) for driving the tool bit in order to improve and stabilize the tightening operation in certain predetermined conditions. This type of power tool has a setting switch disposed on the surface of the housing of the tool and the setting switch permits the operator to set the driving condition. Thus, the drive source can be controlled according to a predetermined condition that is set using the setting switch.

Presently, impact power tools are often used for a variety of operations. For example, a tightening tool adapted to tightening fastening devices (e.g., bolts, nuts, screws, etc.) can be used for a temporary tightening operation, a disassembly operation, and a repairing operation in addition to the usual tightening operation. However, known power tools do not include a setting function that permits the operator to set appropriate condition for these types of operations. Therefore, known power tools cannot be effectively used for such operations.

In addition, because the switch for setting the driving condition is disposed on the surface of the housing, the driving conditions can be freely changed by a variety of people. Thus, the known power tools do not permit the driving conditions to be changed only by an authorized person.

Further, known power tools do not provide means for setting maintenance conditions. Thus, known power tools may be utilized beyond the expected lifetime of one or more components of the power tool and the power tool may break down at an inappropriate time. Thus, a long felt need exists to provide power tools that can provide accurate actual use records and promptly inform the operator if maintenance is recommended or required.

In addition, U.S. Pat. No. 5,289,885 describes an impact wrench that can be used to firmly tighten a threaded object, such as a bolt or a nut. In this type of tightening tool, the torque that is generated depends upon the number of times and the frequency at which the hammer impacts or strikes an anvil. In the '885 patent, a microphone is utilized to detect the impact sound of the hammer striking the anvil. When the number of the impacts by the hammer on the anvil reaches a predetermined number, the motor stops rotating the hammer. Thus, an appropriate amount of torque is applied to the threaded object by stopping the tightening operation when the predetermined number of impacts has been reached.

SUMMARY OF THE INVENTION

It is, accordingly, an object of the present teachings to provide improved power tools.

In one aspect of the present teachings, power tools are taught that can be set to a predetermined driving (operating)

condition and the setting is not easily changeable. For example, persons that are not authorized to change the driving condition can not easily change the driving condition. Therefore, power tool operations can be performed more effectively and uniformly without a risk that unauthorized changes will be made. Further, a variety of operations can be set and the additional operations permit the operator to use the power tool more efficiently.

In another aspect of the present teachings, power tools may include a setting means for setting the driving (operating) condition for the driving force for the power tool. Various types of setting means are contemplated, including but not limited to a dial, a keypad, a sound sensor and/or a remote control device. A processor or other control means may be provided to control the drive source (e.g. motor) for the power tool according to the inputted driving condition set using the setting means. The driving condition input using the setting means may be appropriately selected for the particular mode of operation for the power tool.

In another aspect of the present teachings, power tightening tools are taught that may include, for example, a hammer and an anvil. Preferably, the hammer continuously rotates the anvil in low torque situations. However, in high torque situations, the hammer may intermittently strike the anvil in order to rotate the anvil and as a consequence, impact sounds are generated. Because the anvil is coupled to a tool bit, the anvil can apply a relatively large torque to the tool bit. Such power tools are generally known, e.g., as impact wrenches and impact screwdrivers.

In another aspect of the present teachings, power tightening tools are taught that may include, for example, an oil unit. An oil unit may be utilized, for example, in angle socket drivers (also known as right angle drills). In high torque situations, the oil unit generates an oil pulse and thereby rotates a socket with higher torque. The oil pulse generates an impact sound.

Such power tools may also optionally include a sound sensor or other detecting means that detects the impact sound caused by, e.g. the hammer striking the anvil or the oil pulse from the oil unit. The processor or other control means may control the drive source according to the output of the detecting means and the particular driving condition set by the setting means.

Preferably, the sound sensor or other detecting means is provided to convert impact sounds into electric signals. If the sound sensor is capable of converting sound into an electric signal (e.g. a piezoelectric buzzer as discussed below), the detecting means also typically can emit sounds if an appropriate electric signal is inputted to the sensor. Therefore, the sensor can also be utilized to alert the operator to particular operating conditions of the power tool.

In another aspect of the present teachings, power tools may include a sensor or other means for detecting information other than sound and an electric signal may be output by the detecting means. For example, means may be provided for distinguishing the outputted electric signal from an electric signal that is utilized to set the driving conditions. A setting means may be provided to set the driving condition based upon the electric signal when the electric signal is identified as an electric signal for setting the driving condition. The other physical information that may be detected by the detecting means may include for example acceleration, light (infrared rays, ultraviolet rays) and/or radio waves. Thus, the detecting means may include an acceleration sensor and/or a light sensor for light such as infrared and/or a radio wave sensor.

In another aspect of the present teachings, various driving conditions may be set, including but not limited to any condition that may effectively control the operation of the power tool, such as the operating condition (e.g., tightening torque, disassembly operation, auto stop, etc.) or other alternative functions (e.g. battery check, maintenance check, maintenance warning, etc.). In one preferred embodiment, the operating condition may be set using an electric signal generated by the sound sensor instead of using a mechanical switch. If the detecting means detects physical information and outputs an electric signal, the detecting means can output electric signals as well as set the driving conditions. However, the electric signal outputted from the detecting means is preferably distinguished using a distinguishing means (e.g. processor) in order to determine whether the electric signal is intended to set a driving condition or not. Therefore, improper setting of the driving condition due to an electric signal output from the detecting means can be avoided.

In another aspect of the present teachings, power tools also may include a processor or other means for controlling the driving force of the power tool according to the driving condition set by the setting means. Detecting means may also be utilized and may serve to detect the physical information that is used when the control means controls the driving force of tool. Because the detecting means may also detect physical information in order to control the drive source, it is not necessary to provide a separate detecting means.

A starting switch (e.g. a main switch) is preferably provided to actuate the drive source (e.g. a motor). Preferably, the processor or other distinguishing means may be constructed to identify the signal outputted from the detecting means with the signal for setting the driving condition when the starting switch is actuated in certain situations. In this case, the electric signal outputted from the detecting means is identified with the electric signal for setting the driving condition. Therefore, because actuation of the starting switch controls the distinguishing operation, a separate distinguishing means is not necessary. Further, when a particular situation occurs, the setting of above described condition by the user is not performed so that the user is prevented from inadvertently altering or changing the driving (operating) condition.

In a preferred embodiment, the detecting means may include a material that can detect physical information without touching the detecting means. If the physical information is detected without touching the detecting means, the possibility for generating an inappropriate electric signal by the detecting means during operation is minimized.

In another aspect of the present teachings, a display may be provided to display at least an initial driving condition set by the setting means. In this case, the person (e.g. a supervisor) who set the driving condition can confirm the driving condition by viewing the display. Therefore, errors in setting the driving condition can be avoided. Preferably, the display is provided on a remote control device or other external device that can be utilized to program the power tool. However, the display also may be provided on the power tool.

In another aspect of the present teachings, a memory may be utilized to store a driving condition setting program that can be utilized to set the desired driving (operating) condition. A switch or other starting (actuating) means may be utilized to start the driving condition setting program stored in the memory in an appropriate situation. A setting means may be provided to set the driving (operating) condition by responding to an electric signal outputted from the detecting means in accordance with the program for setting the driving condition when the driving condition setting program starts. In this case, the driving condition setting program is started at an appropriate time by the starting means and the driving condition is set to respond to the electric signal outputted from the detecting means in accordance with the driving condition setting program. Therefore, a mechanical switch is not necessary and the driving condition setting program is not started unless a particular condition occurs. Therefore, the driving condition can not be inadvertently altered during operation.

In another aspect of the present teachings, the detecting means may comprise a sound sensor that is particularly sensitive to the particular frequency range of the impact sounds. In addition, the sound sensor is preferably relatively insensitive to sounds outside the frequency range. Thus, due to the selective sensitivity of the sound sensor, the sound sensor attenuates noises generated by the motor or other components in the power tool, as well as reflected noises, such as reflected impact sounds. By reducing the effect of irrelevant sounds detected by the sound sensor (i.e. motor noises, reflected noise, etc.), the impact sounds can be monitored more precisely. By utilizing a sound sensor adapted to more precisely detect impact sounds generated, e.g., when the hammer strikes the anvil, the precision of the torque applied to the workpiece can be increased.

In a preferred embodiment of the present teachings, the sound sensor utilized for an impact power tool may preferably comprise a piezoelectric material and more preferably, a piezoelectric ceramic material. Such materials have a selective sensitivity to a narrow frequency range and therefore, such materials are advantageously utilized with the present teachings. More preferably, the sound sensor may preferably include a piezoelectric buzzer. Such buzzers are ordinarily utilized to emit a sound within a very narrow frequency. Thus, such buzzers are not utilized as microphones, because the buzzer selectively converts electric signals into sounds within a selective and narrow frequency range. However, such piezoelectric buzzers are particularly advantageous with the present teachings, because the relevant frequency range (i.e. the hammer impact sound or an oil pulse sound) is very narrow. By appropriately selecting a piezoelectric buzzer having a peak frequency range that is approximately equal to the impact sounds, the buzzer can reliably generate electric signals for processing by the processor. Moreover, buzzers are typically inexpensive parts and thereby permit the power tools to be manufactured at a relatively low cost.

In another aspect of the present teachings, the sound sensor may be a sound detecting means having a receiver adapted to convert sounds in a selected frequency range into an electric signal. That is, the sound detecting means selectively generates electric signals based upon impact sounds, but does not generate electric signals based upon other noise generated by the power tool. A processor, such as a microprocessor or CPU, may monitor the electric signals generated by the sound detecting means and count the number of impact sounds. Based upon the number of impact sounds that are counted, the processor can control the hammer drive source (e.g. a motor) to ensure that the appropriate torque is applied to the tightened object.

Because the sound sensor has an increased sensitivity to sounds within a selected frequency range, electric signals generated by the sound sensor, due to frequencies outside the selected frequency range, are substantially reduced or eliminated. Therefore, the hammer impact sounds can be detected more reliably.

In another aspect of the present teachings, the selected frequency range of the sound sensor may be preferably adjusted to include the peak frequency of the impact sound. Although various hammers and anvils will have different frequencies due to differences in the materials utilized to manufacture these components and the manner in which the hammer strikes the anvil, the peak frequency range is generally between about 3.6 kHz to 4.4 kHz and the peak frequency is about 4 kHz.

These aspects and features may be utilized singularly or in combination in order to make improved tightening tools, including but not limited to impact wrenches and impact screwdrivers. In addition, other objects, features and advantages of the present teachings will be readily understood after reading the following detailed description together with the accompanying drawings and the claims. Of course, the additional features and aspects disclosed herein also may be utilized singularly or in combination with the above-described aspects and features.

BRIEF DESCRIPTION OF THE DRAWINGS

FIG. 17 is a representative memory structure for the third representative embodiment;

DETAILED DESCRIPTION OF THE INVENTION

Figure 1:
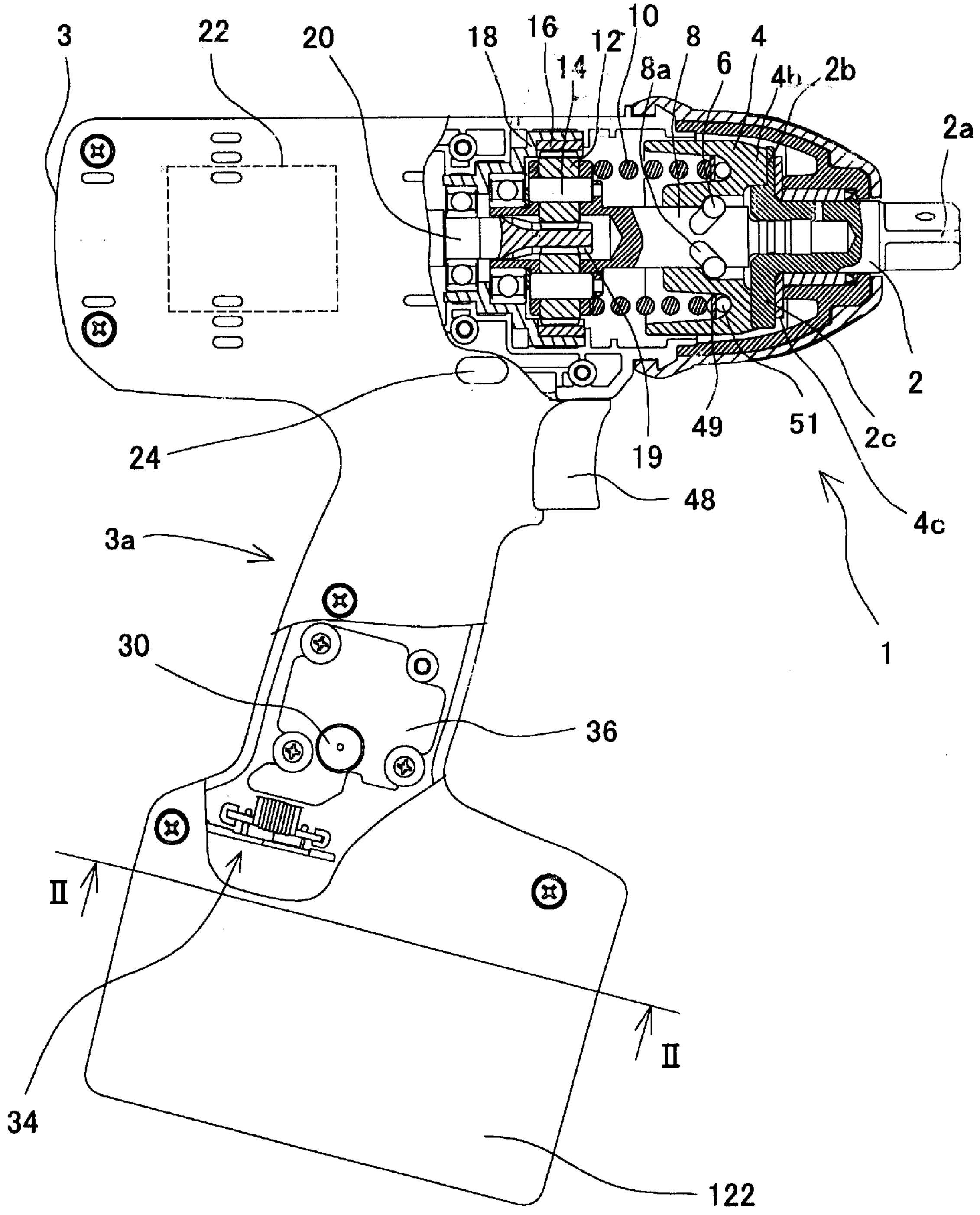
FIG. 1 is a side view, with parts broken away, of an impact wrench according to a first representative embodiment of the present teachings.

The present teachings are preferably utilized with power tools. As discussed below, some aspects of the present teachings are preferably utilized with tightening tools and other aspects of the present teachings can be utilized without restriction in a variety of power tools. For example, means for detecting impact sounds according to the present teachings will find preferable application in tightening tools in which impact sounds and/or oil pulses are generated. However, operating condition setting means and maintenance alarm programs can be utilized with most any power tool in order to provide improved power tools.

Thus, in one aspect of the present teachings, tightening tools, such as impact wrenches and angle socket drivers, may be used in a wide variety of applications to quickly secure various forms of fasteners, such as threaded screws, nuts and/or bolts, to a work surface. The tightening tool may include a trigger switch operated by the user. By engaging the trigger switch, the motor speed of the impact wrench, for example, may be controlled.

Tightening tools, such as impact wrenches and impact screwdrivers, may include, for example, a hammer that is rotatably driven by a drive source, such as an electronic motor or a pneumatic motor. An anvil may be coupled to the object to be tightened by rotating the object. For example, the object may be a threaded screw or another fastening device and a tool bit or chuck may couple the torque supplied by the hammer and anvil to the fastening device. As discussed further below, other types of tightening tools, known as soft impact wrenches or angle socket drivers, may utilize an oil unit in order to generate increased torque.

The hammer may either rotate together with the anvil or the hammer may rotate separately from the anvil and then strike the anvil. The hammer may rotate idly relative to the anvil when the hammer has applied a load to the anvil that is more than a predetermined value. If the fastening object is driven into a workpiece using a relatively small load, the hammer rotates together with the anvil and therefore, the fastening object is continuously driven. However, if the fastening object has been sufficiently tightened so that the load applied to the anvil by the hammer exceeds the predetermined value, the hammer will rotate separately from the anvil and will strike or impact the anvil after idly rotating for a predetermined angle. Thus, the hammer will repeatedly impact the anvil and the anvil will slightly rotate after each impact. As a result, the power tool can generate increased torque in order to securely fasten the fastening object in the workpiece.

In one aspect of the present teachings, the tightening torque generated by the tightening tool depends on the number of impacts by the hammer on the anvil. These impacts generate noises that can be detected by a sound sensor or detector. Preferably, the sound detector has a selectivity for the peak frequency of the impact sounds in order to generate reliable electric signals based upon the impact sounds. For example, preferred sound detectors generate electric signals based upon the impact sounds and attenuate other sounds that are not significant, such as motor sounds and reflected noises. By selectively detecting the impact sounds, the number of impacts can be reliably determined. As a result, the torque applied to the fastening object also can be reliably generated by the tightening tool. However, as discussed below, several aspects of the present teachings are not limited to such sound detectors and these aspects will be discussed further below.

In another aspect of the present teachings, tightening tools may include an anvil and a hammer adapted to strike, and thereby rotate, the anvil. Means for detecting the impact sounds of the hammer on the anvil may be provided and may include a receiver adapted to convert sounds within a selected frequency range into electric signals. Preferably, the electric signals generated based upon sound frequencies within the selected frequency range are larger than the electric signals generated based upon sound frequencies that are outside the selected frequency range. A processor or other counting means may count the number of hammer impacts based upon the number of electric signals generated by the sound sensor or other detecting means. When the number of hammer impacts reaches a number appropriate for a previously selected torque (i.e., the operator may select the desired torque before beginning the fastening operation), the tightening operation may be concluded. For example, a processor or other means for controlling a drive source, e.g. a motor, may be provided to rotate the hammer and to stop the motor rotation when the appropriate number of impact sounds has been detected by the detecting means (e.g. sound sensor).

In another aspect of the present teachings, the selected frequency range preferably includes the peak frequency of the impact sounds. In another aspect of the present teachings, the sound detector comprises a piezoelectric element. According to the present specification, "piezoelectric material" is intended to mean a material that generates electric signals when pressure from sound waves causes the piezoelectric material to vibrate. The sound waves may either strike the piezoelectric material directly or strike a diaphragm that contacts the piezoelectric material.

In another aspect of the present teachings, a sound sensor is provided to selectively convert hammer impact sounds into electric signals. A comparator may be coupled to the sound sensor and a reference signal. When the electric signal from the sound sensor is greater than the reference signal, the output of the comparator may change. A processor or other similar circuit may be provided to count the output changes from the comparator and thereby count the number of hammer impacts. The processor or other control means may then control the hammer drive source (e.g., a motor) in order to stop the drive source after a selected number of impacts have been detected. Thus, the fastening object can be reliably tightened to a precise torque.

The sound sensor may preferably be a piezoelectric buzzer having a peak frequency range that is substantially the same as the peak frequency range of the hammer impact sounds. In certain situations, impacts sounds generated within the tightening tool will be emitted and then will reflect off the workpiece. As a result, the sound sensor could detect the reflected echoes and impact signals may be generated in error. Thus, in situations in which reflected echoes are a particular concern, the tightening tool preferably utilizes a sound sensor having a narrow sensitivity range, as will be discussed further below. However, if reflected echoes are not a concern, either because the impact sounds are relatively soft or the intended workpiece is not expected to significantly reflect echoes, a variety of sound sensors can be utilized and the type of sounds sensor is not particularly limited.

In another aspect of the present teachings, power tools are taught that include means for setting one or more operating conditions into the power tool. Although this aspect of the present teachings can be utilized with any type of power tool, preferred embodiments concern tightening tools. The setting means can be a variety of devices, including without particular limitation, one or more dials for manually setting an operating condition, a sound sensor adapted to detect impact sounds generated by the operator and/or a remote control device that communicates operating condition information to the power tool via infra-red frequencies, radio waves or electric signals. A keypad may be provided either on the power tool and/or the remote control in order to input driving (operating) conditions. The power tool may include a processor or other control means that is coupled to the setting means in order to receive and process the operating condition information. In one particular aspect of these teachings, the power tool may initiate usage of new operating conditions after a switch coupled to the drive source is actuated.

A variety of different operating conditions may be set using the setting means. In a preferred embodiment, tightening tools may be programmed to automatically stop when an appropriate amount of torque has been applied to the fastening device. Therefore, the tightening tool can reliably tighten fastening devices to the pre-selected torque. In addition, a variety of maintenance alarm conditions can be set. For example, maintenance alarm settings may include hours of operation for various components of the power tool. Thus, if the usage of one or more components exceeds a previously set usage level (maintenance condition), the power tool may warn the operator to perform maintenance. In addition or in the alternative, the power tool may cease operation until the necessary maintenance is performed.

In preferred embodiments of this aspect of the present teachings, the power tools may be tightening tools that include an impact sound sensor adapted to detect sounds generated when the hammer strikes the anvil. This impact sound sensor may also be utilized to set the operating conditions. For example, the operator may strike the housing of the tightening tool and the impact sound sensor may detect these impact sounds and communicate the number of strikes (impacts) to a processor or other means for receiving operating condition information. Thereafter, the processor or other control means can execute the operating conditions that have been set by striking the housing. This embodiment provides a convenient and inexpensive means for setting and changing operating conditions. In addition, this embodiment may optionally include a processor or other means for distinguishing the electric signal received from the impact sound sensor from an electric signal corresponding to the set driving condition. Further, the power tool may also include a switch coupled to the drive source (e.g. a motor) in order to actuate the drive source. The distinguishing means may identify the signal outputted from the detecting means to set the operating condition when the switch is actuated in certain situations.

Power tools that are controlled based on a set driving condition may include a sensor or other detecting means that detects physical information and outputs an electric signal based upon detected physical information. In addition, a memory may store an operating condition setting program. Means for starting the operating condition setting program in a predetermined condition also may be provided. Further, means for setting the operating condition may be provided and may respond to the electric signal outputted from the detecting means in accordance with the operating condition setting program.

In another aspect of the present teachings, power tools may include means for detecting physical information and generating an electric signal in response to detected physical information, a memory storing an operating condition setting program, means for inputting operating condition parameters, and a processor adapted to execute the operating condition setting program in order to input operating condition parameters. A switch may be coupled to the drive source in order to actuate the drive source. In addition, the switch may be adapted cause the power tool to operate according to a new set of operating condition parameters. Means for setting the operating condition for the power tool (e.g. dial, remote control device, sensor, keypad, etc.) is coupled to a processor and the processor receives information concerning a set operating condition. Thereafter, the drive source may be controlled according to the set operating condition after the switch has been actuated.

In another aspect of the present teachings, power tools are taught that include a program adapted to notify the operator that a maintenance operation should be performed. For example, the program may store information concerning the actual use history of one or more components of the power tool. Based upon this actual use history, the program can notify the operator of a required maintenance operation when the actual use exceeds a predetermined use level. The predetermined use level can be set during the manufacturing process, or more preferably, the operator can re-set the predetermined use level.

In this aspect of the present teachings, power tool may preferably include a memory adapted to store information concerning the actual use of the power tool. The same memory or a different memory may store maintenance information. For example, the maintenance information may be an upper limit for usage before the maintenance condition warning will be communicated to the operator. A processor may be provided to compare the actual use information with the stored maintenance information in order to determine whether to notify the operator and/or stop the operation the power tool until the proper maintenance is performed.

Means for resetting the actual use history of the power tool also may optionally be provided. Thus, if a particular component of the power tool has been replaced during a maintenance operation, the actual use history for that particular component can be reset to zero (or another number if a refurbished part is used).

Further, a variety of maintenance conditions can be provided either individually or collectively. For example, a maintenance warning level may be provided. If the power tool is used for more than a predetermined use level, a warning will be given that the power tool is due for maintenance. However, the operator can continue to use the power tool. In addition or in the alternative, a maintenance stoppage level may be provided. In this case, if the power tool usage exceeds the maintenance stoppage level, the power tool will be disabled and the operator will not be able to use the power tool until the required maintenance is performed. In addition or in the alternative, a maintenance predicting means may be provided. For example, the status of the power tool usage can be checked at periodic intervals and the expected power tool usage before the next status check can be inputted. If the power tool is likely to exceed one or more maintenance conditions before the next scheduled status check, the operator will be notified and the maintenance can be performed immediately in order to avoid interruptions in later use.

Various embodiments may be realized based upon this aspect of the present teachings. Means for alerting the operator may be provided so that the operator understands that maintenance is necessary. The alerting means may generate the operator notification based upon the actual use history of the power tool or one or more components within the power tool. Means for resetting a memory containing a maintenance condition (usage level) may be provided to re-set the maintenance schedule of the power tool after the maintenance has been performed. Naturally, means also may be provided to disable the power tool either at the time that the notification is provided, or after a predetermined period usage and/or time subsequent to the notification.

Various structures may be utilized to receive maintenance condition information from an external device (e.g. a remote control device, a computer coupled to the power tool via a cable, impact sounds generated by the operator, etc.). For example, the power tool may comprise a signal receiver adapted to receive maintenance condition information transmitted from the external device. The receiver may be a radio wave sensor, infrared sensor, sound sensor, etc. or may be a cable that communicates electric signals from the external device. A memory may store the input maintenance condition received by the receiver. The same or a different memory may also store information concerning the actual use history of the power tool and/or one or more components of the power tool.

Means for resetting the actual use history of the power tool also may be provided. Further, various alarms may be utilized (e.g. visual alarm, audio alarm, etc.) to alert the operator that maintenance is advised or required. In addition, the alarm may simply disable the power tool so that the power tool can not be utilized until the maintenance is performed.

In another aspect of the present teachings, a single external device may be utilized to manage a plurality of power tools. The external device may be, for example, a remote control device, a general use computer, a special use computer or any other external device that is appropriate. The external device may be capable of transmitting information to a plurality of power tools and each power tool may selectively communicate with the external device. For example, the power tools may communicate information concerning the actual use history of each power tool to the external device. The external device preferably includes a memory adapted to store actual use information in individual registers corresponding to the respective power tools.

In this preferred aspect, power tools preferably include a transmitter that is adapted to transmit identifying information concerning the particular power tool. The transmitter is also preferably adapted to communicate actual use history information to the external device. Naturally, the power tool may also include a receiver adapted to receive instructions from the external device.

The external device may also comprise a transmitter and a receiver to facilitate communications with the respective power tools. That is, the external device may use the transmitter and receiver in order to identify the particular power tool to which it is communicating. After the external device has identified the particular power tool, the external device may communicate various instructions to the power tool and/or may receive information from the power tool. For example, the external device also may include a memory adapted to store actual use history data for each of the respective power tools. This actual use history data may be stored according to a particular address for the particular power tool.

In addition or in the alternative, the external device may include a maintenance condition inputting means for inputting identifying information and maintenance condition memory information for the power tool. A memory may store the inputted maintenance condition according to the inputted identifying information. Further, means may be provided to identify the maintenance condition data stored in the memory storing according to the identifying information received by the receiver. Maintenance instruction information may be outputted according to the actual use history. This actual use history may be reset by a resetting means as discussed above.

For example, the actual use history may include a number or value indicating the total numbers of hours that a particular component has actually been used. The external device and/or the power tool may include a processor or other comparison means to compare the actual use history with a predetermined (stored) maximum usage level (i.e. a stored maintenance level). The stored maintenance level may be, for example, a total number of hours of use for that particular component before which a particular maintenance operation is required. Thus, a maintenance alarm may be given when the total number of hours of use exceeds the stored maintenance level or value.

Each of the additional features and method steps disclosed above and below may be utilized separately or in conjunction with other features and method steps to provide improved power tools and methods for making and using the same. Detailed representative examples of the present teachings, which examples will be described below, utilize many of these additional features and method steps in conjunction. However, this detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the present teachings in the broadest sense, and are instead taught merely to particularly describe representative and preferred embodiments of the present teachings, which will be explained below in further detail with reference to the figures. Of course, features and steps described in this specification may be combined in ways that are not specifically enumerated in order to obtain other usual and novel embodiments of the present teachings and the present inventors contemplate such additional combinations.

First Detailed Representative Embodiment

FIG. 1 shows a first detailed representative embodiment of the present teachings, which is impact wrench 1 having motor 22 that is disposed within housing 3. A gear 19 is disposed on output shaft 20, which is coupled to motor 22. Gear 19 engages a plurality of planet gears 12, which are rotatably mounted on pin 14. Internal gear 16 is disposed within internal gear case 18 and engages pin 14. The gears may reduce the driving speed of a tool bit (not shown). Further, pin 14 engages planet gear 12 and may be fixedly attached to a spindle 8, which is rotatably mounted within housing 3.

Spindle 8 may be rotatably driven by motor 22 using a reduction gear mechanism comprising gears 12, 16 and hammer 4 is rotatably mounted on the spindle 8. A cam mechanism having a plurality of recesses 8*a* and bearings 6, which are disposed within recesses 8*a*, is interposed between hammer 4 and spindle 8. Recesses 8*a* are formed within spindle 8 in a V-shape and thus extend obliquely relative to the longitudinal axis of spindle 8. The cam mechanism permits hammer 4 to move along spindle 8 in the longitudinal direction by a predetermined distance. Compression spring 10 is interposed between hammer 4 and spindle 8 via bearing 51 and washer 49 so as to normally bias hammer 4 in the rightward direction of FIG. 1.

Anvil 2 is rotatably mounted on the forward end of housing 3 and cooperates with hammer 4 to generate a tightening torque. Forward portion 2*a* of anvil 2 may have a polygonal cross-section that is adapted to mount the tool bit (not shown). The tool bit may then engage the fastening device in order to drive the fastening device into the workpiece. The rear end of anvil 2 preferably has two protrusions 2*b*, 2*c* that radially extend from anvil 2. The forward portion of hammer 4 also preferably has two protrusion 4*b*, 4*c* that radially extend from hammer 4. Protrusions 2*b*, 2*c* and protrusions 4*b*, 4*c* are adapted to abut each other.

When the fastening device is tightened using a relatively low torque, the force transmitted from protrusions 4*b*, 4*c* to protrusions 2*b*, 2*c*, as well as the force applied to hammer 4 by spindle 8 via bearings 6, is relatively small. Thus, hammer 4 continuously contacts anvil 2 due to the biasing force of spring 10. Because the rotation of spindle 8 is continuously transmitted to anvil 2 via hammer 4, the fastening device is continuously tightened.

However, when the tightening torque becomes larger, the force transmitted from protrusions 4*b*, 4*c* to protrusions 2*b*, 2*c*, as well as the force applied to hammer 4 by spindle 8 via bearings 6, becomes larger. Thus, a force that urges hammer 4 rearward along spindle 8 becomes larger. When the force applied to anvil 2 by hammer 4 exceeds a predetermined force (i.e. a threshold force), hammer 4 moves rearward and protrusions 4*b*, 4*c* disengage from protrusions 2*b*, 2*c*. Therefore, hammer 4 will rotate idly relative to anvil 2 (i.e. no force is transmitted from hammer 4 to anvil 2 for a portion of the rotation). However, as protrusions 4*b*, 4*c* pass over protrusions 2*b*, 2*c*, hammer 4 moves forward due the biasing force of the spring 10. As a result, hammer 4 strikes or impacts anvil 2 after each rotation at a predetermined angle. By changing the operation of the tightening tool so that hammer 4 repeatedly strikes anvil 2, the torque applied to the fastening device increases as the number of impacts increases.

Handle 3*a* extends downwardly from housing 3. Switch 48 is arranged to start motor 22 and switch 24 is arranged to change the rotational direction of the motor 22. Both switch 48 and switch 24 may be mounted on handle 3*a*.

A representative control device may include setting device 34 and control substrate 36 is mounted within the bottom portion of handle 3*a*. Setting device 34 may be mounted on the bottom of handle 3*a* and can be operated by an operator in order to input a number when battery 122 is separated from impact wrench 1. Preferably, battery 122 is a rechargeable battery pack that can be removably attached to the bottom of handle 3*a*. Thus, accidental changes to the setting number can be prevented because the setting device 34 is covered by battery 122 during usual operation. Other components, such as microcomputer 38 and switch 40, also may be mounted on control substrate 36. Buzzer 30 (receiver) may be utilized to convert impact sounds into electric signals and may also be mounted on control substrate 36. Switch 40 may be, for example, a transistor and buzzer 30 may be, for example, a piezoelectric buzzer in a preferred aspect of the present teachings. However, other receivers 30 may be utilized with the present teachings, including without limitation condenser microphones, as discussed further below.

Figure 2:
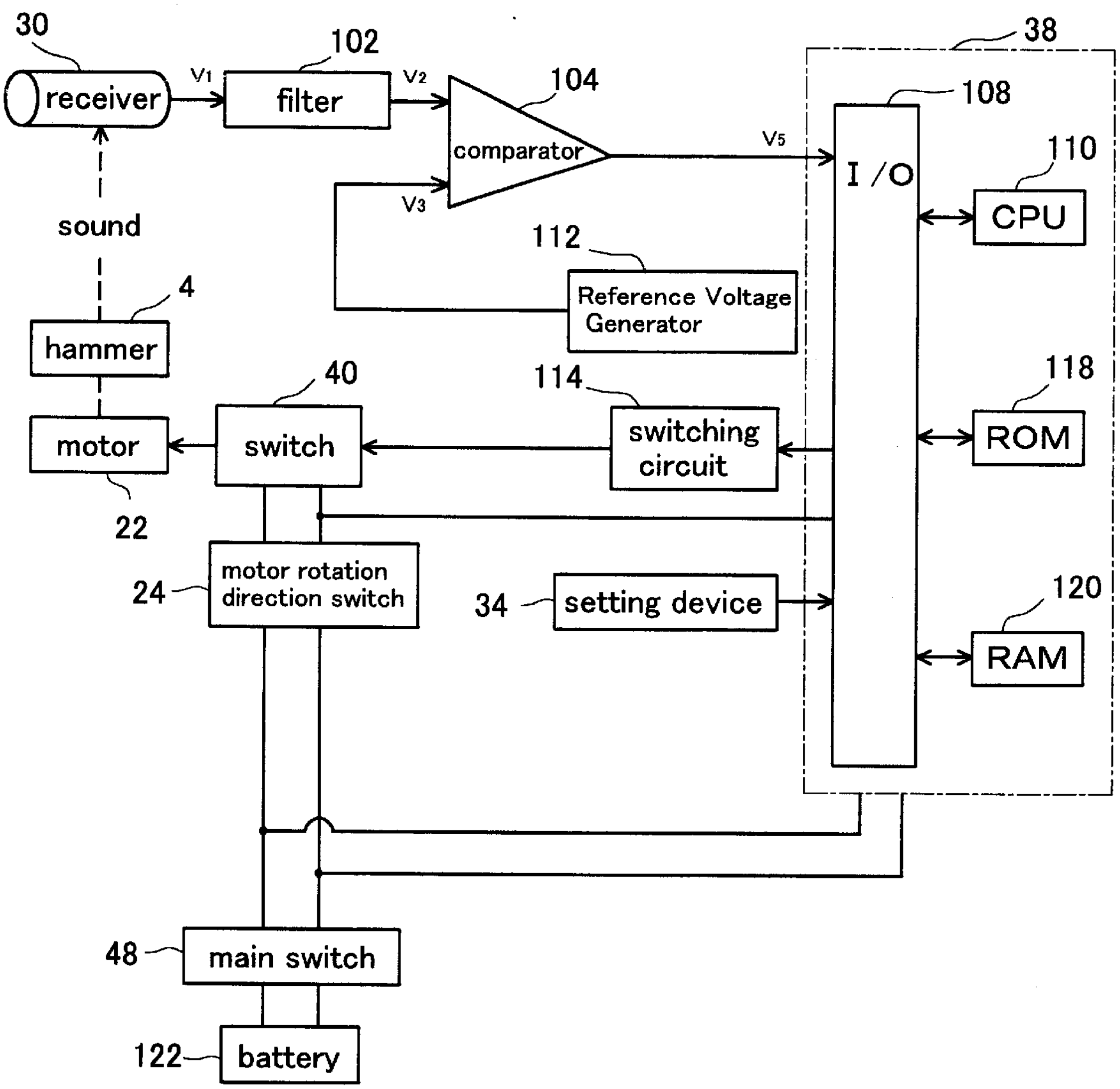
FIG. 2 is a block diagram showing a representative circuit for the first representative impact wrench.

A representative circuit diagram for the control device of tightening tool 1 will be explained with reference to FIGS. 2–4. As shown in FIG. 2, microcomputer 38 may preferably include CPU 110, ROM 118, RAM 120 and I/O (interface) 108. These components may be preferably integrated onto a single semiconductor (IC) chip. ROM 118 may preferably store control programs to operate motor 22. These control programs may utilize signals from buzzer 30 in order to execute the control programs.

Buzzer 30 may be connected to one terminal of comparator 104 via filter 102. Reference voltage generator 112 generates voltage V3 that is coupled to the other terminal of comparator 104. The output of comparator 104 is coupled to microcomputer 38. Battery 122 may supply power to motor 22 via switch 40 and switch 24 may be utilized to change the rotational direction of motor 22. Switch 40 is preferably coupled to microcomputer 38 via first switching circuit 114. Setting device 34 is also coupled to microcomputer 38. Switch 40 controls the operation of motor 22.

Figure 3:
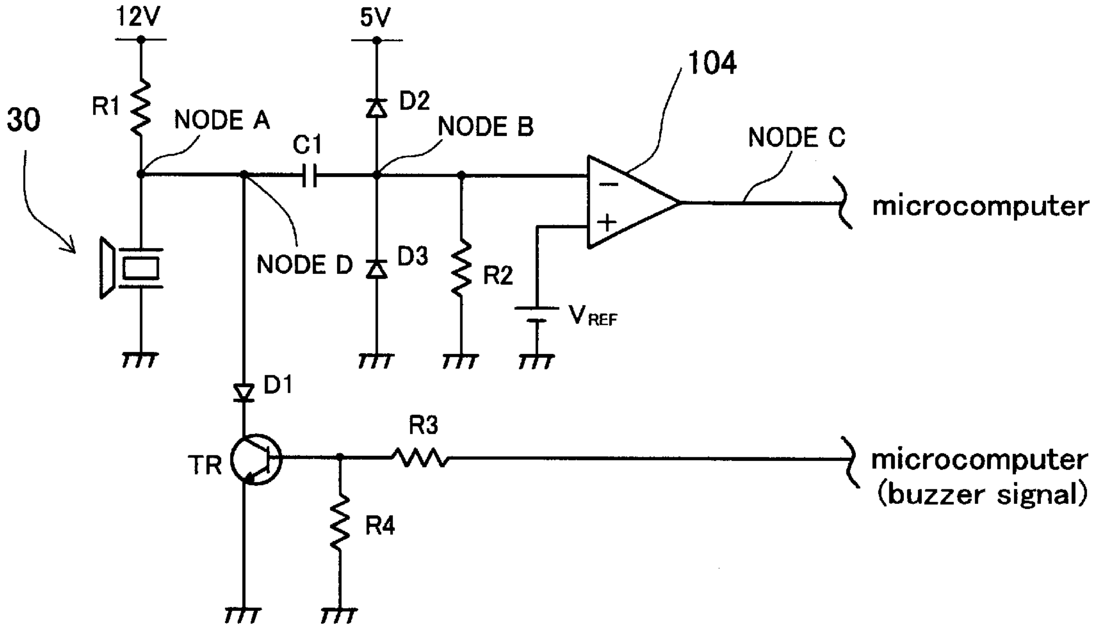
FIG. 3 is a block diagram showing another representative circuit of the first representative impact wrench.
Figure 4:
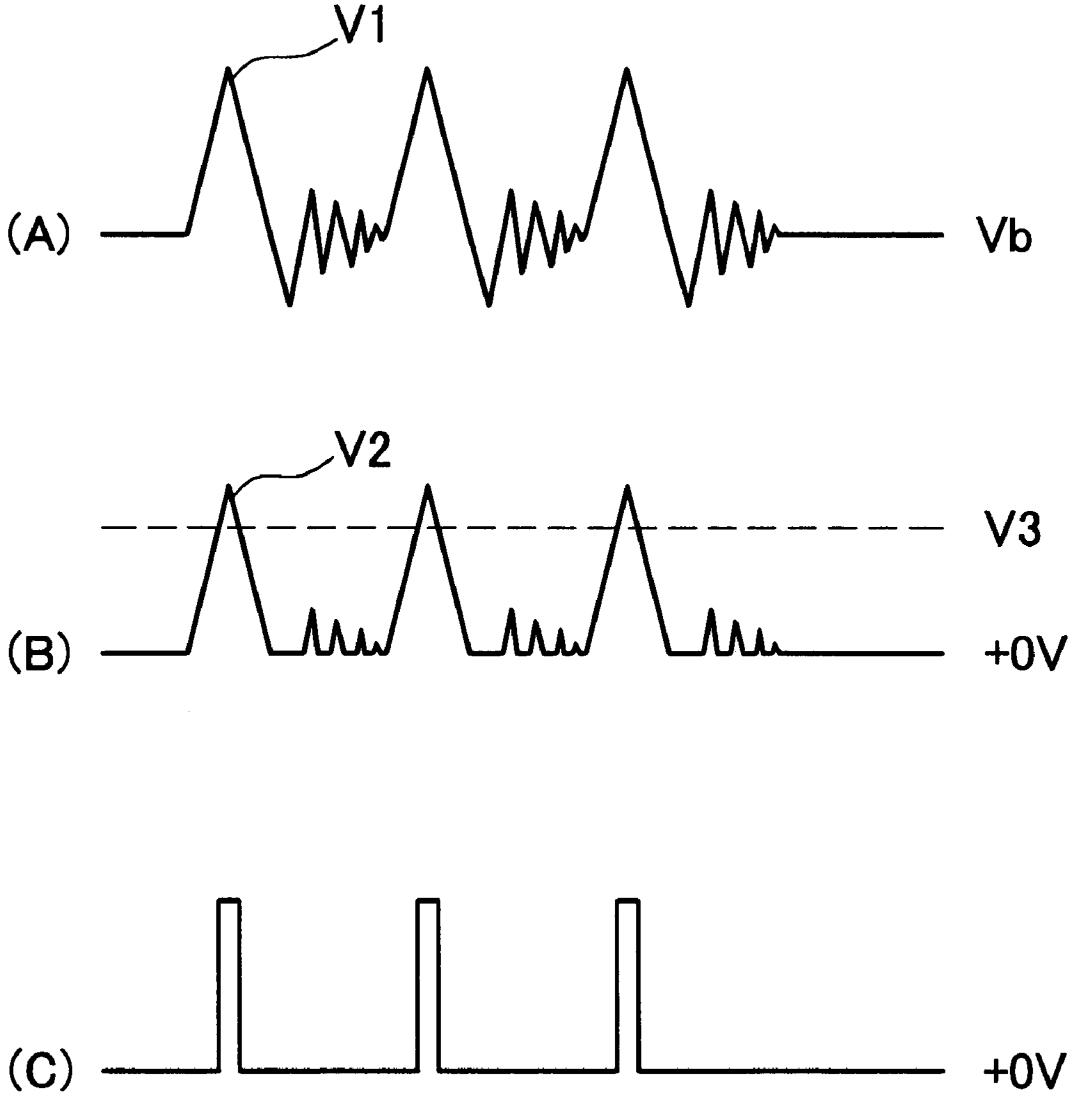
FIG. 4 depicts three graphs showing voltages at nodes A, B, C of the circuit of FIG. 3.

FIG. 3 shows a representative impact sound detecting circuit, which may preferably include piezoelectric buzzer 30 in this preferred aspect of the present teachings. Buzzer 30 may be coupled to a 12V power supply via resistor R1 and buzzer 30 may be also coupled to one terminal of capacitor C1. The other terminal of capacitor C1 may be coupled to one terminal of comparator 104 and the other terminal of the comparator 104 is connected to the reference voltage Vref, which may be generated by voltage generator 112 shown in FIG. 2. Node B (between capacitor C1 and comparator 104) is coupled to ground via diode D3 and is also coupled to a 5V power supply via diode D2. Node D is coupled to diode D1, transistor TR and resistors R3 and R4. The buzzer signal shown in FIG. 3 may be generated by microcomputer 38 and this signal is inputted to the base of transistor TR. The emitter terminal of transistor TR may be connected to ground. The buzzer signal is utilized to cause buzzer 30 to emit a sound, such as a warning sound, and will be described in further detail below.

A representative method for operating of the circuit shown in FIG. 3 will now be explained. When impact sounds are produced by hammer 4 striking anvil 2, the impact sounds cause buzzer 30 to covert the impact sounds into electric signals, i.e. voltage V1 shown in FIG. 4(A). The signal shown in FIG. 4(A) is an alternating current wave that spikes when an impact sound is detected. This spike is superimposed on reference voltage Vb, which is subtracted from the divided 12V power supply. DC components and negative voltage components in the signal shown in FIG. 4(A) are filtered by capacitor C1 and diode D3, respectively. FIG. 4(B) shows the filtered signal at node B. This signal is input to comparator 104 and is compared to reference voltage V3. If voltage V2 is higher than voltage V3, the output of comparator 104 changes. On the other hand, when voltage V2 is less than voltage V3, the output of comparator 104 does not change. FIG. 4(C) shows the output of comparator 104 based upon the input signal of FIG. 4(B), which is essentially a square wave. The output of comparator 104 is coupled to microcomputer 38 and microcomputer 38 preferably counts the number of square waves in order to count the number of times that hammer 4 has struck anvil 2.

When the microcomputer 38 is in a mode to detect impact signals, microprocessor 38 maintains transistor TR in an OFF mode. Therefore, node D is not coupled to ground via transistor TR. However, as mentioned above, buzzer 30 also may be utilized to generate sounds. For example, if the tightening tool includes an alarm feature (discussed further below) to warn the operator of a potentially inappropriate operation, the buzzer 30 may generate a warning sound. In this case, microcomputer 38 may output a buzzer signal (corresponding pulse signal) to transistor TR and thereby alternatively bias transistor TR on and off. Consequently, the voltage at Node A will alternative between 12V and ground, which alternating voltage will cause the buzzer 30 to output a sound.

Preferably, the buzzer 30 is selected to have a peak frequency that corresponds to the peak frequency of the impact sounds of the hammer 4 striking the anvil 2. In a particularly preferred embodiment, a piezoelectric ceramic buzzer (in particular part number PKM22EPP-4001 of Murata Manufacturing Co., Ltd.) is utilized. This particular piezoelectric buzzer is designed to output sound within a narrow frequency range that is centered around 4 kHz. That is, the peak frequency of the sound pressure level of the emitted sound is approximately 4 kHz. When this piezoelectric buzzer is used as a receiver for converting impact sounds into electric signals, the piezoelectric buzzer converts sounds within the particular narrow frequency range (a narrow frequency range centered at 4 kHz) into electric signals. Sound frequencies outside this narrow frequency range are attenuated.

Thus, preferred piezoelectric ceramic buzzers are characterized by including a piezoelectric ceramic plate and electrodes are placed on opposite sides of the ceramic plate. The ceramic plate is attached to a metal plate (e.g. brass, stainless steel) using a conductive adhesive. Together, the ceramic plate and metal plate define a diaphragm and the diaphragm may be mounted in a resonating cavity, for example, using a node mount.

In addition or in the alternative, preferred receivers can be characterized as having a single peak frequency. Within 10% on either side of the peak frequency, the sensitivity of the receiver is preferably reduced by at least 50%. For example, if the peak frequency of the receiver is 4 kHz, the sensitivity to a frequency of 3.6 kHz and a frequency of 4.4 kHz is at least 50% less than the sensitivity to a frequency at 4 kHz. At frequencies less than 3.6 kHz and greater than 4.4 kHz, the sensitivity will be further reduced (attenuated). Thus, preferred receivers in this aspect of the present teachings are particularly sensitive within a narrow frequency range and are relatively insensitive to sound frequencies that are outside of the narrow frequency range. Preferably, the peak frequency of the receiver is substantially the same as the frequency of the impact sounds. As discussed below with respect to the third representative embodiment, the receiver may be selected to substantially correspond to the peak frequency of an oil unit that generates oil pulses, although other receivers may be advantageously utilized with the second and third representative embodiments.

In addition, preferred piezoelectric buzzers are not required to include any internal circuitry. That is, comparator 104 preferably receives signals directly from electrodes coupled to the piezoelectric material. Further, transistor TR is directly coupled to buzzer 30 in order to cause buzzer 30 to emit sounds based upon buzzer signals from microcomputer 38.

In order to select a desired torque to be applied to the fastening object, the operator sets the torque and microprocessor 38 stops motor 22 when the counted number of impacts reaches a number that corresponds to the pre-selected torque that was set by the operator. The process is continued as long as main switch 48 is turned on and is terminated when main switch 48 is turned off. The process is again started when main switch 48 is again turned on.

Figure 5:
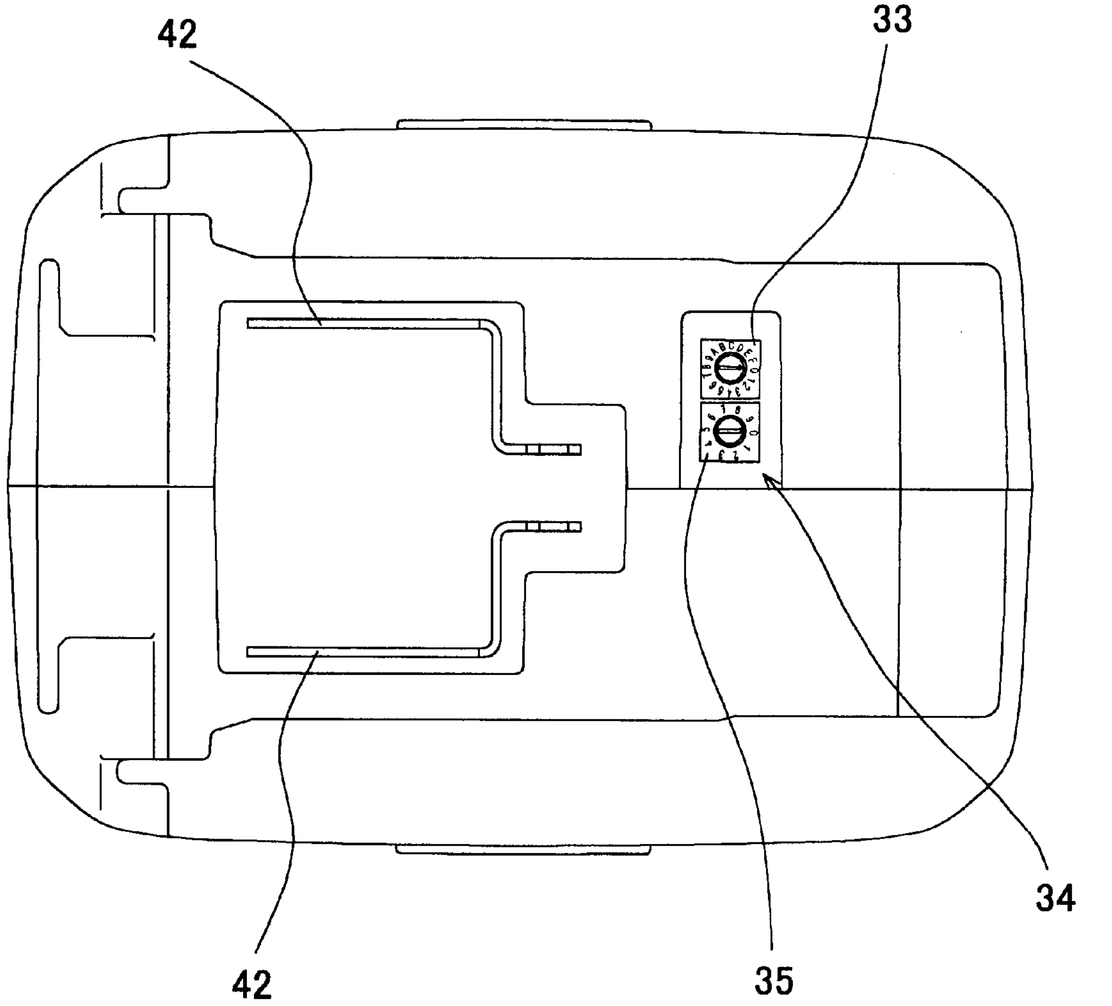
FIG. 5 is a representative setting dial that may be used as a setting means in the present teachings.
Figure 6:
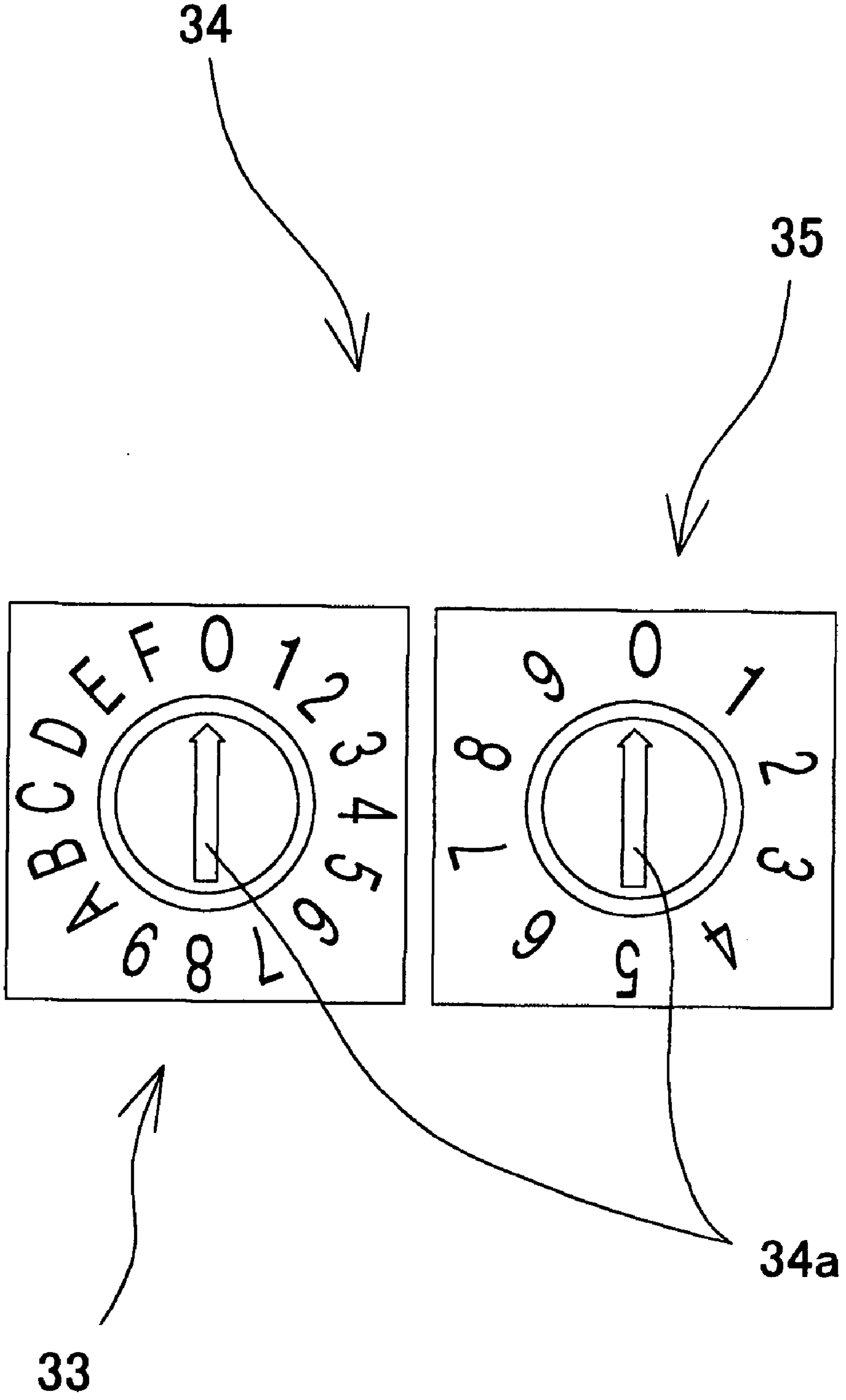
FIG. 6 is an enlarged view of the setting dial of FIG. 5.

In this embodiment, setting means 34 may be a dial or a set of dials that are mounted on the bottom of handle 3*a*. FIG. 5 shows the tightening tool along line II shown in FIG. 1 and thus shows the bottom portion of tightening tool 1 in the situation in which battery 122, which may preferably be a rechargeable battery pack, has been separated from the tightening tool. FIG. 6 shows an enlarged view of dial section 34, in which first setting dial 33 and the second setting dial 35 are disposed within dial section 34. First setting dial 33 may include numerical (e.g. 0 to 9) and alphabetic indicators (e.g. A to F). Therefore, 160 combinations for setting conditions (e.g. from [00] to [F9]) are possible by using setting dial section 34. Adjusting recesses 34*a* are provided within first and the second dials 33, 35. Thus, by inserting the edge of the screwdriver or other flat object and turning adjusting recess 34*a*, each dial can be set to the required number. Because dial section 34 is only accessible when battery 122 is detached from power tool 1, the user is prevented from inadvertently changing the setting conditions during operation.

As shown in FIG. 5, electrodes 42 are disposed on the bottom of housing 3 and electrodes 42 may contact electrodes (not shown) disposed on battery 122 when the battery 122 is attached.

A representative method for utilizing microcomputer 38 and various modes for operating tightening tool 1 will now be explained. For example, using setting device 34, various operating conditions may be set for the power tool. These operating conditions include, but are not limited to, a torque setting mode (i.e. impact number setting mode), temporary tightening mode, disassembly mode, etc. Thus, the setting device 34 can be utilized to set operation condition for the power tool for a particular operation. Thereafter, the power tool may be utilized according to the particular setting until the operating condition is reset. This feature allows the operator to reliably utilize the power tool in each particular operation condition (situation) and therefore improves the efficiency of the operator. Detailed representative operating modes are now described, but naturally other operating modes are contemplated. Setting device 34 can be utilized to set a variety of operating conditions, including operating conditions that are not specifically disclosed herein for purposes of brevity. In addition, other setting means, such as the sound sensor, keypad, remote control device, external device, etc., which are described below may be utilized to set the following representative operating conditions.

(1) Impact Number Setting Mode (Tightening Operation Mode)

In a first operational mode for tightening tool 1, the indicated number of first setting dial 33 on setting dial section 34 may be set between 0 to 9. Microcomputer 38 determines that a tightening operation will be performed and the number of times that hammer 4 will strike anvil 2 is set by setting dial section 34. The operation is continued as long as the main switch 48 is turned on and is terminated when the main switch 48 is turned off. The tightening operation is again started when the main switch 48 is again turned on. Preferably, the number of impacts determines the amount of torque that is applied to the fastening device. Thus, if the operator wishes to pre-determine the applied torque, setting dial section 34 is utilized to set a predetermined number of impacts. Thereafter, tightening tool 1 is operated according to the predetermined number of impacts that have been programmed into microcomputer 38. A representative method for programming microcomputer 38 will now be described.

Upon turning on (actuating) main switch 48, the number set using the setting device 34 is read by microcomputer 38 and is stored as a variable number [xy] in RAM 120. In this example, “xy” means a double digit number, wherein “x” represents units of 10 and y represents units of “1.” Thus, the number 53 is represented as x equals 5 and y equals 3. Subsequently, microcomputer 38 determines whether the value set using setting device 34 is “00” (I mode). If the value set by setting device 34 is “00”, the impact number is 0 and motor 22 will not rotate even if main switch 48 is turned on (actuated). Thus, inputting “00” into setting device 34 can be utilized to determine whether the setting dial section 34 is operating correctly.

If the set value is not “00”, the process proceeds and microcomputer 38 determines whether the set value is “99.” If the value “99” is set (II mode), microcomputer 38 proceeds to turn on (actuate) switch 40. Thus, if the value “99” is set, motor 22 is driven as long as main switch 48 is on (actuated). By setting the value “99”, the operator can perform a continuous tightening operation.

If any value between “00” and “99” is set (III mode), microcomputer 38 determines whether motor rotation direction switch 24 is in the forward direction or the reverse direction. Such determination may be performed by detecting a potential at one lead wire that connects switch 24 to switch 40, because this potential will change in response to changing the state of switch 24. If microcomputer 38 determines that switch 24 is in the reverse direction, motor 22 continuously drives the tool bit (not shown) until main switch 48 is turned off. The reverse operation may be utilized, for example, to unscrew or remove a screw from a workpiece.

On the other hand, if microcomputer 38 determines that switch 24 is in the forward direction, microcomputer 38 calculates a value Z based upon the set number that was previously input as the number “xy.” For example, setting device 34 may communicate the number “xy” to RAM 120 and microcomputer 38 may read RAM 120 in order to determine “xy.” Z may calculated based upon the following representative equation:

$$Z=2([x\times10]+y)+1$$

For example, if the set number input to setting device 34 is "50" (i.e. x equals 5 and y equals 0), the impact number determined by this equation is 101. After the previously set impact number is stored in RAM 120, switch 40 is turned on to start rotation of motor 22. Buzzer 30 stands by to detect impact sounds and when an impact sound is detected, buzzer 30 outputs a signal to comparator 104.

When microcomputer 38 detects the outputted pulse signal from comparator 104 at the input port of microcomputer 38, CPU 110 subtracts "1" from the previously set impact number stored in RAM 120. The microcomputer 38 thereafter determines as to whether the result of the subtraction by "1" has become "0." If the result is "0", switch 40 is turned off to stop rotation of motor 22. If the result is not "0," the process repeatedly performed until the result is "0." Therefore, the rotation of motor 22 will be stopped when the counted number of detected impacts of hammer 4 on anvil 2 reaches the set number.

The above description concerns the case in which the indicated number is selected from "0" to "9" on the first setting dial 33 (previously set impact number mode). If first setting dial is set to a letter between "A" to "F", various other operations are possible.

For example, if "A" is set on first setting dial 33 (second setting dial may be any number between "0" to "9"), the motor 22 is de-activated (disabled) and therefore, no driving force is provided in any situation. Thus, inadvertent setting of the driving condition by users can be avoided. Further, confusion and error in setting the operation mode [B] and other setting modes can be avoided.

Naturally, each of the numbers, letters and values described in this embodiment and the embodiments below are merely representative examples and various modifications can be made to these numbers, letters and values in order to achieve substantially the same result.

(2) Temporary Tightening Operation

If the letter [B] is set on the first setting dial 33 (IV mode), a temporary tightening operation may be performed. In the temporary tightening mode, the tightening torque for the fastening device must not be too strong in order to only temporarily tighten the fastening device. However, if motor 22 stops too late, the fastening device may be tightened too securely. On the other hand, if the motor 22 stops too early, the fastening device may be too loose.

Thus, by setting [B] on first setting dial 33, the tightening tool functions in the temporary tightening operation mode. When main switch 48 is turned on (actuated), microcomputer 38 identifies whether motor rotation direction switch 24 is set to the forward direction or the reverse direction. If switch 24 is set for the forward direction, the detected time from the first time that hammer 4 strikes anvil 2 to the stopping time of the motor 22 is obtained from the number [y] set on the second setting dial 35 (more specifically, [y]×0.1 second). This information is stored in RAM 120.

Thereafter, microcomputer 38 outputs an appropriate driving signal to rotate motor 22. When a pulse signal is received from the comparator 104, motor 22 rotates continuously for the set time stored in RAM 120 and then stops rotating when the time period expires. Therefore, in the temporary tightening mode, even if the user inadvertently keeps main switch 48 turned on too long, the rotation of motor 22 will be stopped automatically after the specified period of time has passed from the first time that hammer 4 strikes anvil 2. Thus, the temporary tightening operation can be effectively and reliably performed.

If motor rotation direction switch 24 is set to the reversed position, motor 22 is actuated by main switch 48 and continues rotating until the time that main switch 48 is turned off. (The impact count auto stop function is not active.)

(3) Disassembly Operation

If the letter [C] is selected on first setting dial 33(V mode), a disassembly operation mode is enabled. In a disassembly operation, a tightened fastening device must be loosened in order to remove the fastening device from the workpiece. When the loosening operation is initiated, the hammer 4 strongly strikes the anvil 2 and this impact force loosens the fastening device. When the fastening device loosens sufficiently, the hammer 4 will not strike the anvil 2 and thus impact sounds are not generated and detected. Therefore, main shaft 8 continuously rotates the hammer 4 and anvil 2 in order to continuously loosen the fastening device. However, if the motor 22 is stopped too late, the fastening device may be completely loosened and thus, inadvertently fall out of the workpiece. As a result, the fastening device may be lost.

Accordingly, if letter [C] is set on first setting dial 33, tightening tool 1 is set for a disassembly operation. When switch 24 is set to the reverse position, actuation of main switch 48 causes motor 22 to start rotating in the reversed direction. The reverse rotation continues until a specific time has passed after the last detected impact sound by receiver 30. Thus, motor 22 will automatically stop after a predetermined amount of time. It is, of course, possible to set the specific time for the disassembly operation by setting an appropriate number [y] on second setting dial 35 (again, [y]×0.1 second).

Thus, when main switch 48 is turned on, the number indicating the specific time that is set on setting dial section 35 is read by microcomputer 38 and is stored in RAM 120. Motor 22 starts to rotate when switch 40 is turned on. Thereafter, microcomputer 38 monitors the output of comparator 104. After receiving the first pulse signal from comparator 104, the time between the previous pulse signal and the next pulse signal is calculated by microcomputer 38. If this time period exceeds the predetermined set time (i.e. the predetermined set time indicated by dial section 34), microprocessor recognizes that hammer 4 is no longer striking anvil 2. Thus, microcomputer 38 continues to bias on (actuate) switch 40 to rotate motor 22 for the period of time stored in RAM 120. Thus, when the period of time stored in RAM 120 after the detection the hammer strike is completed, switch 40 is biased off.

Thus, in the disassembly operation, if the user maintains main switch 48 in the ON position, motor 22 will automatically stop after the previously set time has passed. Therefore, motor 22 automatically stops before the fastening device is completely released from the workpiece and the disassembly operation can be performed more efficiently, because the user is not required to search for fastening devices that have fallen out of the workpiece.

If switch 24 is set to the forward direction, motor 22 starts when main switch 48 is actuated and will continue to rotate until the time that main switch 48 is turned off. (The impact count auto stop function is not active.)

(4) Torque Adjusting Mode

If the letter [D] is set on first setting dial 33(VI mode), the tightening torque may be adjusted. If the tightening torque of tightening tool 1 is too strong, the fastening device may be damaged by a single impact of hammer 4 on anvil 2. While the operator could selectively actuate main switch 48 in order to adjust the tightening torque, such fine control of main switch 48 may be difficult to perform, especially by an inexperienced operator. Thus, the appropriate tightening torque may not be obtained. Therefore, by setting first setting dial 33 to letter [D], the tightening torque can be appropriately adjusted and the appropriate torque will automatically be applied to the fastening device. In the VI mode, the rotating speed of motor 22 is set to a predetermined speed regardless of the direction of switch 24.

Second setting dial 35 may be utilized to set the rotating speed of motor 22 for the condition that main switch 48 is completely pulled or actuated. If [y] is "0", motor 22 will rotate at the normal rotating speed. Similarly, if [y] is "9", the motor 22 will rotate at 90% of the normal speed and if [y] is "8", the motor will rotate at 80% of the normal driving rotation speed and so on. Thus, the setting number [y] for second setting dial 35 may be utilized to adjust the rotating speed of motor 22 according to the equation "[y]×10%", as described above. In the VI mode, the impact count auto stop function is not active.

(5) Repairing Operation Mode

If setting [E] is selected for first setting dial 33 (VII mode), a repairing operation mode is indicated. In these types of tightening tools, some electronic parts, such as setting dial section 34 or microcomputer 38, may be damaged due to vibrations caused by hammer 4 striking anvil 2. In that case, repair is necessary. While detection and replacement of the damaged part is necessary, detection in known power tools has often been very difficult and primarily depended on the experience and sense of the operator. This aspect of the present teachings seeks to overcome this particular problem of the known art.

Therefore, if letter [E] is selected on first setting dial 33, the detection of a damaged part can be easily performed in the repairing operation mode. A representative diagnostic method will now be described.

If switch 24 is set to the forward direction in mode VII, the motor 22 will not operate, even if main switch 48 is turned on. When main switch 48 is actuated, microcomputer 38 executes a diagnostic program and approximately 2 seconds later, the receiver 30 may emit a certain number of predetermined sound pulses. The number of pulses can be predetermined by adding "1" to [y] that has been set on second setting dial 35. For example, if [y] has been set to "2", three short sound pulses will be emitted. Thus, microcomputer 38 communicates buzzer signals to receiver 30 and, 2 seconds after the actuation of main switch 48 has been detected, receiver 30 will emit sound pulses according to the number of buzzer signals outputted by microcomputer 38.

As a result, the operator can easily detect whether setting dial section 34 has been damaged and/or whether the timer function of microcomputer 38 is operating normally. If no sound pulses are emitted or an incorrect number of pulses are emitted, the operator is notified that tightening tool 1 has been damaged. In VII mode, the operation of receiver 30 (receiving operation) can be detected and the termination of motor 22 by microcomputer 38 can be provided.

Microcomputer 38 preferably executes a program in order to stop motor 22 when a particular number of sound pulses are detected by receiver 30 after the motor 22 has started rotating due to actuation of main switch 48. The number of detected pulses that the receiver 30 detects before motor 22 is stopped can be set using second setting dial 35. Again, "1" may be added to [y] in order to determine the pre-selected number of pulses.

While main switch 48 is actuated, the operator can strike housing 3 (using a screwdriver or other appropriate object) a predetermined number of times. If motor 22 stops after the predetermined number of strikes, receiver 30 and microcomputer 38 are operating normally. However, if motor 22 does not stop, the operator will understand that tightening tool 1 probably has a defective part.

(6) Microcomputer Check• Battery Check Operation Mode

If the letter [F] is set on first setting dial 33 (VIII mode), a microcomputer operation check can be performed. A control program stored in ROM 118 of microcomputer 38 may control motor 22 and receiver 30. The stored control program of microcomputer 38 may be changed for various reasons (e.g. the microcomputer may be upgraded to a newer version), but the operator may not be certain of the particular microprocessor that is currently being used in the power tool. Therefore, if microcomputer 38 must be replaced for repair or upgrade, the selection of an appropriate microcomputer 38 may not be easy. Thus, in this embodiment, setting [F] may be utilized to execute a simple check to determine the version of microcomputer 38 utilized by tightening tool 1.

If [0] is set on second setting dial 35 (VIII mode), the version of microcomputer 38 is checked by actuating main switch 48. For example, receiver 30 may emit a series of sounds that indicates the particular version code of microprocessor 38. For example, if microcomputer 38 is version "2.1," a pattern of two long sounds, one long silence and one short sound may be emitted from the receiver 30. Naturally, motor 22 does not operate in this mode. Thus, a simple version check for installed microcomputer 38 can be easily performed and the appropriate microprocessor version can be selected for replacement.

If [1] is set on second setting dial 35 in VIII mode, the battery voltage can be checked. By actuating main switch 48, microcomputer 38 transmits a pattern of buzzer signals to receiver 30 to cause receiver 30 to emit a certain pattern of sounds. Naturally, the particular pattern of sounds will indicate the battery voltage. For example, if the battery voltage is 23 volts, a pattern of two long sounds, one long silence and three short sounds may be emitted by receiver 30. Again, motor 22 preferably does not operate during this mode.

This check mode permits the operator to easily check the battery voltage. If the battery voltage deviates from the expected value, the battery may require replacement. Therefore, by checking the battery voltage before operation, the operator can avoid the situation in which the power tool stops during operation because the battery voltage is not sufficient.

Moreover, in the VIII mode, motor 22 is maintained in a stopped condition, even if main switch 48 is actuated. Therefore, unauthorized operation of the tool (including theft) can be prevented. By setting tightening tool 1 to VIII mode, tightening tool 1 can not be utilized until the mode is changed, which may deter theft.

If [0] or [1] is set on second setting dial 35, the microcomputer check function and battery check function is performed, but other numbers for second setting dial 35 are not recognized by microcomputer 38. However, it is of course possible to provide other functions by setting second setting dial 35 to other numbers when first setting dial 34 is set to [F].

As above described, the program controls motor 22 and receiver 30 by simply setting appropriate numbers using setting dial selection 34 according to the operation mode. Therefore, each operation can be effectively and reliably performed.

Further, receiver 30 may convert impact sounds into electric signals, which are then used to detect the number of times that hammer 4 has struck anvil 2. Moreover, receiver 30 may emit sounds by inputting an electric (buzzer) signal into receiver 30. Thus, receiver 30 can perform a variety of functions.

While the detecting means is preferably a piezoelectric buzzer, other detecting means may be utilized to detect the number of times that hammer 4 strikes anvil 2. Other detecting means include means for detecting the retreating action of the hammer towards the shaft (e.g. a neighboring switch, light sensor etc.). Also, means for detecting a change in the electric current supplied to the motor (e.g. ammeter, etc.) or means for detecting changes in the rotation angle of the motor (e.g. a frequency detector, rotation position detector, encoder, etc.) may be utilized. If the impacts are detected without detecting the impact sounds, the operator alerting means can be a structure other than a buzzer. For example, a light emitting diode may be utilized to communicate information to the operator, as discussed in the second representative embodiment. In this case, the operator may be notified of information, such as microprocessor version, battery voltage, etc., by flashing the light an appropriate number of times.

In order to demonstrate the particular advantage of using a piezoelectric material to detect impact sounds generated by a hammer striking an anvil in a tightening tool, impact sounds were measured using the Murata piezoelectric buzzer noted above and compared to impact sounds measured using a condenser microphone. Condenser microphones can detect a comparatively wide frequency range. In addition, tests were conducted in which echoes were suppressed during the testing and tests were also conducted in which echoes were not suppressed in order to simulate typical operating conditions, such as for example, high torque tools that are used to fasten metal bolts into metal beams. By analyzing the measured impact sound using Fast Fourier Transform (FFT) analysis, the peak frequency of the impact sound was determined to be approximately 4 kHz.

Figure 7:
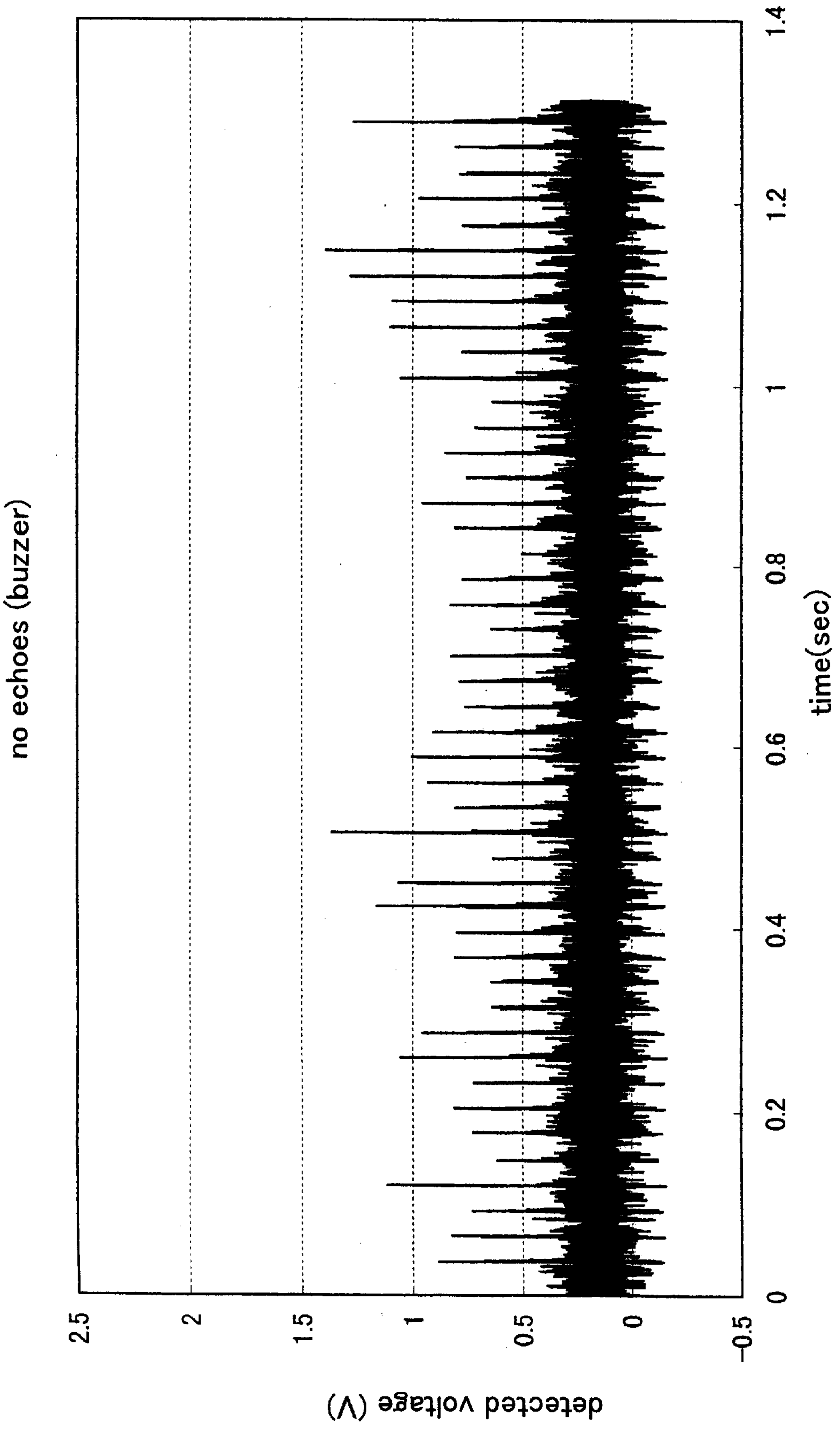
FIG. 7 graphically depicts results of using a piezoelectric buzzer in a situation in which echoes have been suppressed.
Figure 8:
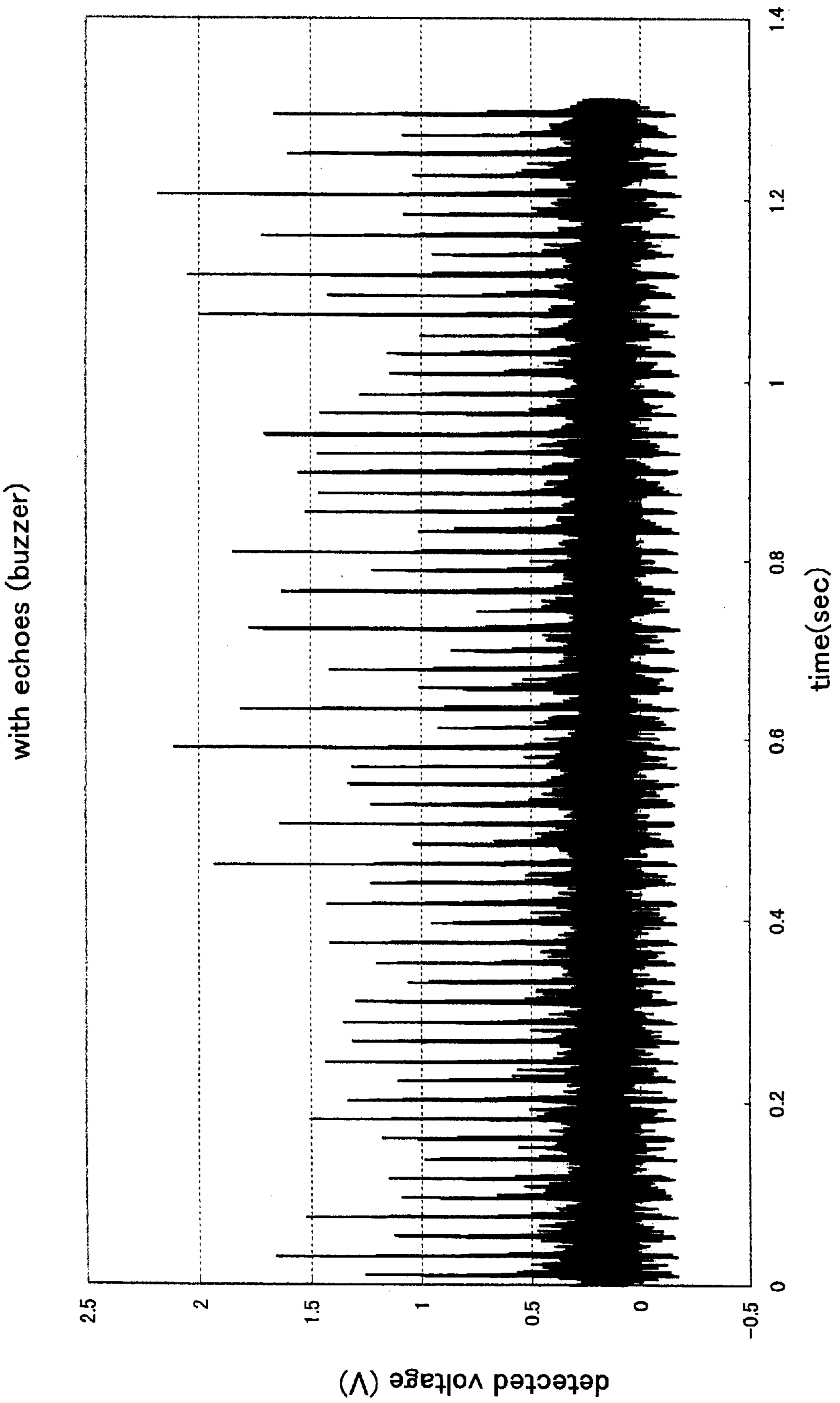
FIG. 8 graphically depicts results of using a piezoelectric buzzer in a situation in which echoes have not been suppressed.
Figure 9:
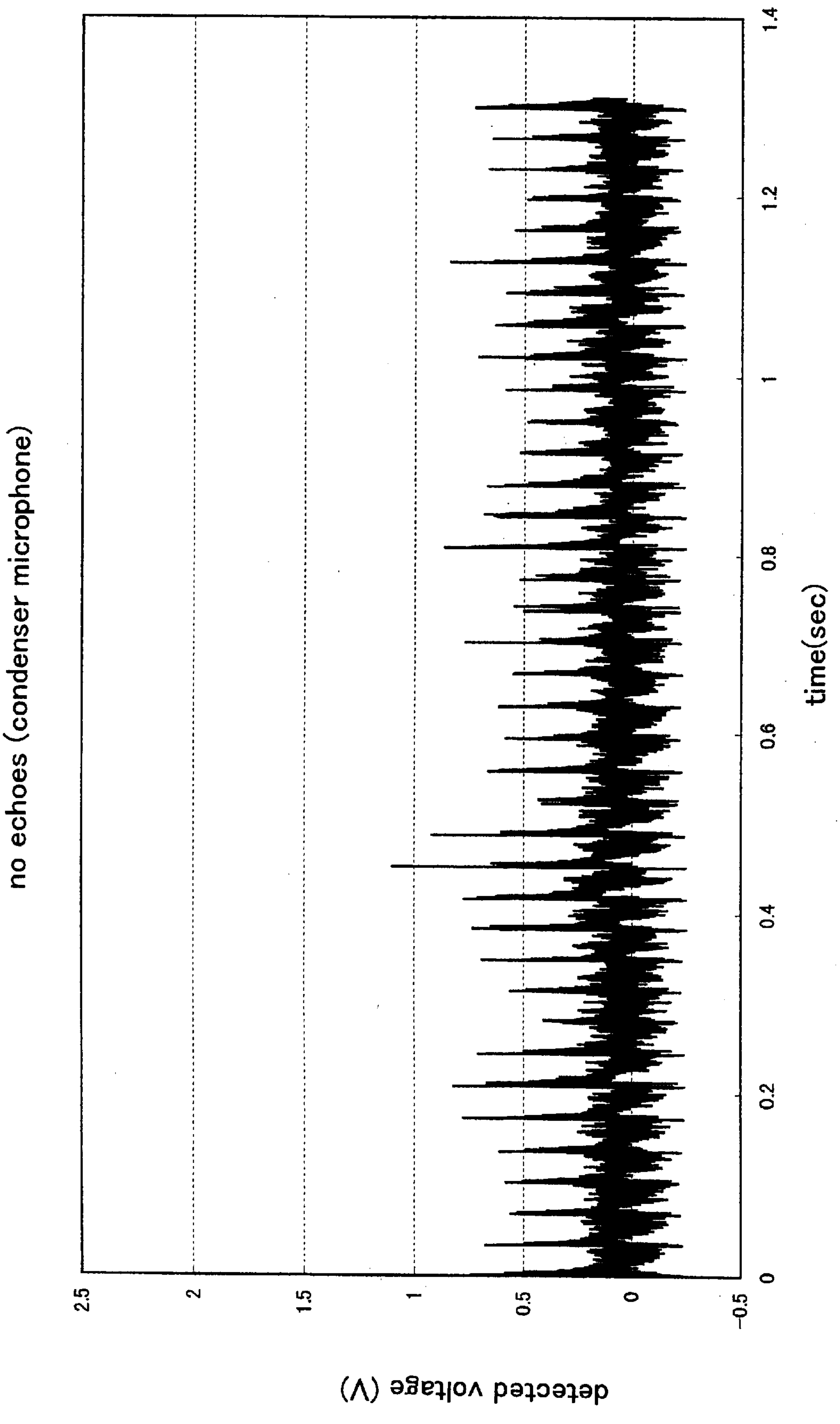
FIG. 9 graphically depicts comparative results of using a condenser microphone in a situation in which echoes have been suppressed.
Figure 10:
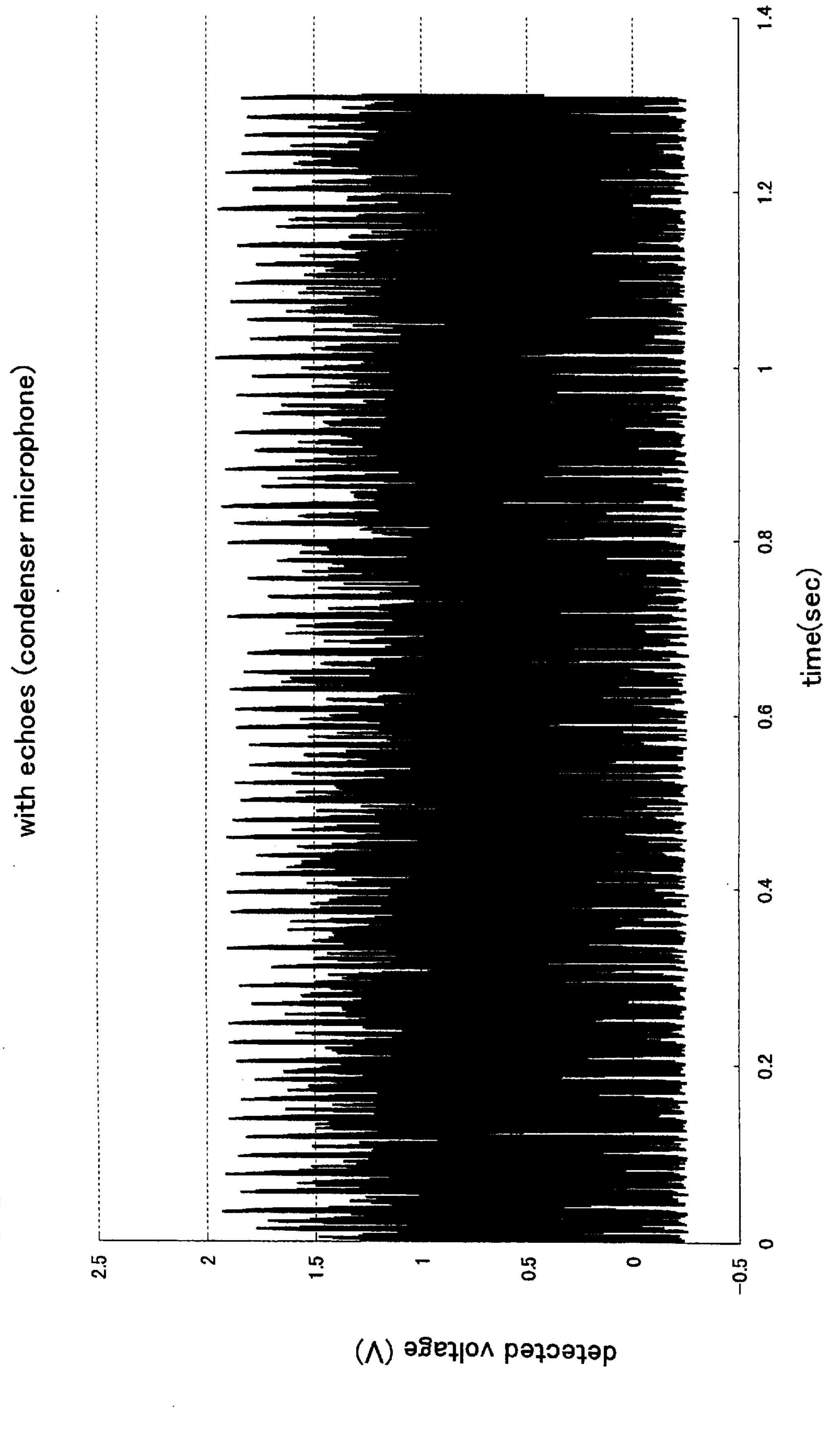
FIG. 10 graphically depicts comparative results of using a condenser microphone in a situation in which echoes have not been suppressed.

In the following experimental results, the input signal supplied to comparator 104 was measured while operating a 200 Newton class impact wrench. FIGS. 7 and 8 show the experimental results of using a piezoelectric buzzer in this tightening tool. FIGS. 9 and 10 show the experimental results of using a condenser microphone to detect the impact sounds. Further, FIGS. 7 and 9 show the experimental results in which echoes were suppressed. FIGS. 8 and 10 show the experimental results when echoes were not suppressed. Thus, FIGS. 8 and 10 represent an ideal situation for the microphone, because the receiver is not subjected to impact sounds that are reflected from the workpiece, which may be a metal beam. On the other hand, FIGS. 7 and 9 represent an actual working situation, as the receiver will be subjected to reflected impact sounds from the workpiece.

As shown in FIGS. 7 and 8, the piezoelectric buzzer selectively detected impact sounds, regardless of whether echoes were present, and the influences of other irrelevant noises were substantially eliminated. Thus, the piezoelectric buzzer accurately detected the peak impact sounds and the intervals between the impacts. However, when the condenser microphone was used, the condenser microphone could not substantially distinguish between the impact sounds and other noises when echoes were permitted as shown in FIG. 10. Thus, the condenser microphone could easily distinguish impact sounds when echoes were suppressed (FIG. 9) and thus, condenser microphones may be appropriately utilized in low noise environments, such as the angle socket driver described below. However, in high torque impact wrenches and other tools subjected to noisy environments, piezoelectric materials are particularly advantageous.

Thus, a piezoelectric buzzer may effectively eliminate the influence of irrelevant noises and thereby improve the accuracy of detecting impact sounds. In particular, impact sounds were accurately detected even when using tightening tool that provides 200 Newtons of torque under the condition that noises and echoes were not suppressed. Thus, the piezoelectric buzzer can inherently act as an efficient filter to eliminate irrelevant noises without requiring complex circuitry. Consequently, manufacturing costs can be reduced.

Although not wishing to be bound by theory, one explanation for the advantage of the piezoelectric buzzer concerns the nature of the reflected impact sounds. For example, a metal workpiece (e.g. a metal beam) may reflect the impact sounds at a frequency that is different from the original frequency. Thus, the piezoelectric buzzer is sensitive to the original impact sounds, because those impact sounds are within the sensitive frequency range. However, if the reflected impact sounds have shifted in frequency, the reflected impact sounds may be outside of the sensitive frequency range of the piezoelectric buzzer. Therefore, the reflected impact sounds are effectively attenuated.

Moreover, the piezoelectric buzzer can optionally be utilized as a sound emitting device to alert the operator of a special situation. Therefore, the piezoelectric buzzer can efficiently perform two or more functions without increasing the cost of production.

Naturally, various modifications can be made to the above-described teachings. For example, although a piezoelectric buzzer was specifically described, a dynamic microphone that selectively generates electric signals based upon sounds within a narrow frequency range may also detect the impact sounds. Further, the impact sound receiver can also include a vibrating member, such as a diaphragm structure. The particular frequency of the vibrating member preferably corresponds to the peak frequency of the impact sounds. Naturally, other devices, such as a dynamic speaker, may be utilized to convert the vibrations of the vibrating member into electric signals.

Further, although the above described piezoelectric buzzer has a peak resonant frequency of approximately 4 kHz, the frequency level of the piezoelectric buzzer can be selected to adapt to the maximum tightening torque and the form of housing of the tightening tool. Thus, the persons skilled in the art will understand that the particular frequency range selected by the designer is dependent upon various factors. The designer may first manufacture a prototype of the tightening tool and then measure the frequency of the impact sounds generated by the prototype. Thereafter, an appropriate impact sound receiver can be selected in order to maximally detect the impact sounds in view of the present teachings.

Second Detailed Representative Embodiment

A second representative power tool will now be explained with reference to FIGS. 11–13. The structure, set driving conditions and controlling operations for the second representative embodiment are substantially the same as the first representative embodiment. However, the second embodiment differs from the first embodiment, because the second embodiment does not include a setting dial (34) for setting the driving (operating) condition. Instead, in this embodiment, the housing is struck with an appropriate object and receiver 30 generates electric signals in response to the housing being struck. These electric signals from receiver 30 are input to microcomputer 38 and are utilized to set the driving condition. Therefore, the following discussion will focus on the differences between the first and second representative embodiments and description of common parts and features is not necessary.

Figure 11:
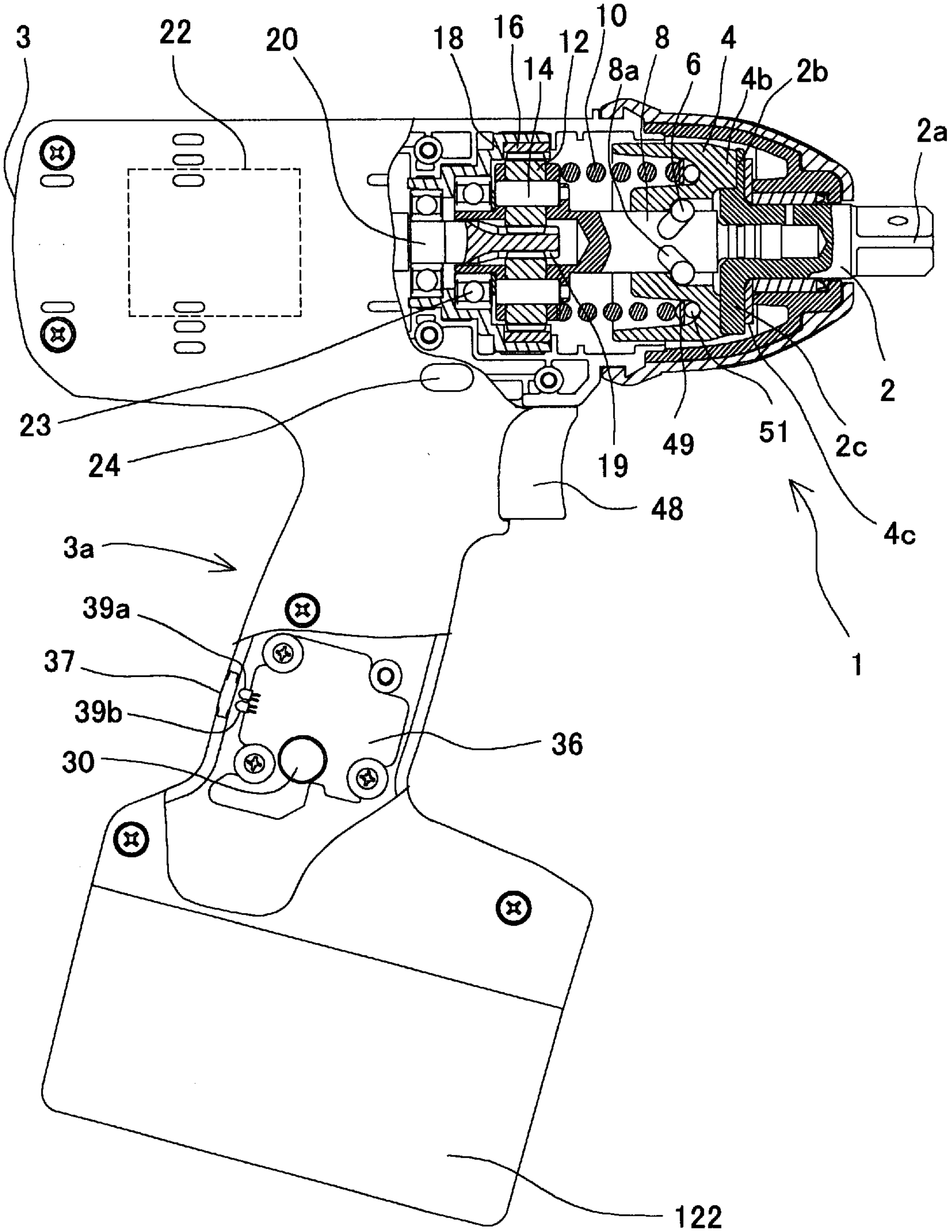
FIG. 11 is a side view, with parts broken away, of an impact wrench according to a second representative embodiment of the present teachings.

FIG. 11 is a partial cross sectional side view showing an overall structure of the second representative embodiment of tightening tool 1. Elements that are common to FIG. 1 and FIG. 11 are assigned the same reference numerals. In the second representative embodiment, setting dial 34 is not provided and therefore, other means are provided to input the desired driving (operating) condition. Therefore, control substrate 36 includes a red light emitting diode (LED) 39*a* and a green LED 39*b* in addition to other electronic parts, such as microcomputer 38 and receiver 30. Receiver 30 may be selected from a variety of sound detecting devices and is not limited to a piezoelectric buzzer in this representative embodiment. The red LED 39*a* and the green LED 39*b* preferably indicate the driving (operating) condition through a viewing window 37 that is disposed on the bottom portion of the handle 3*a*.

Figure 12:
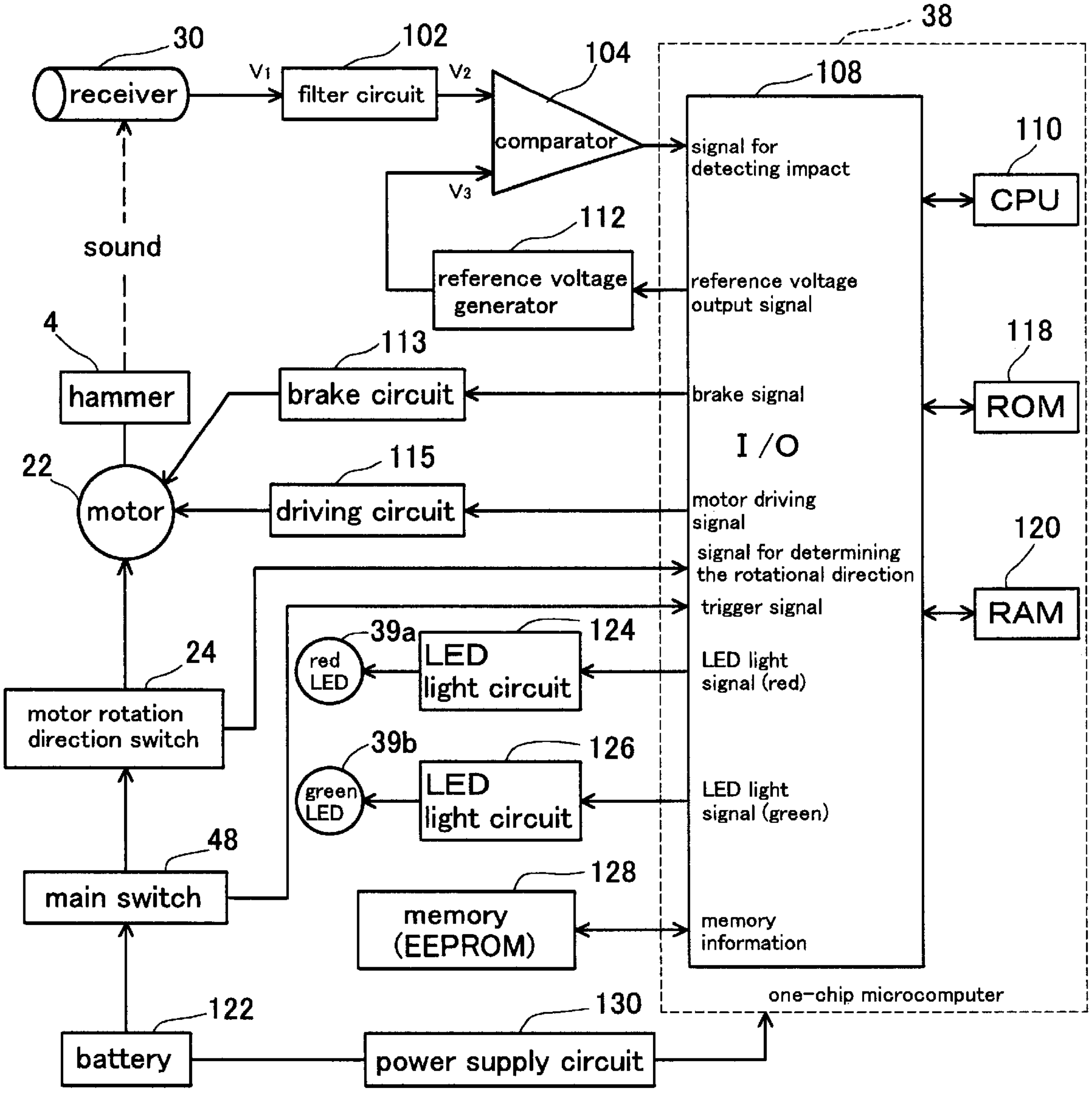
FIG. 12 is a block diagram showing a representative circuit for the second representative impact wrench.
Figure 13:
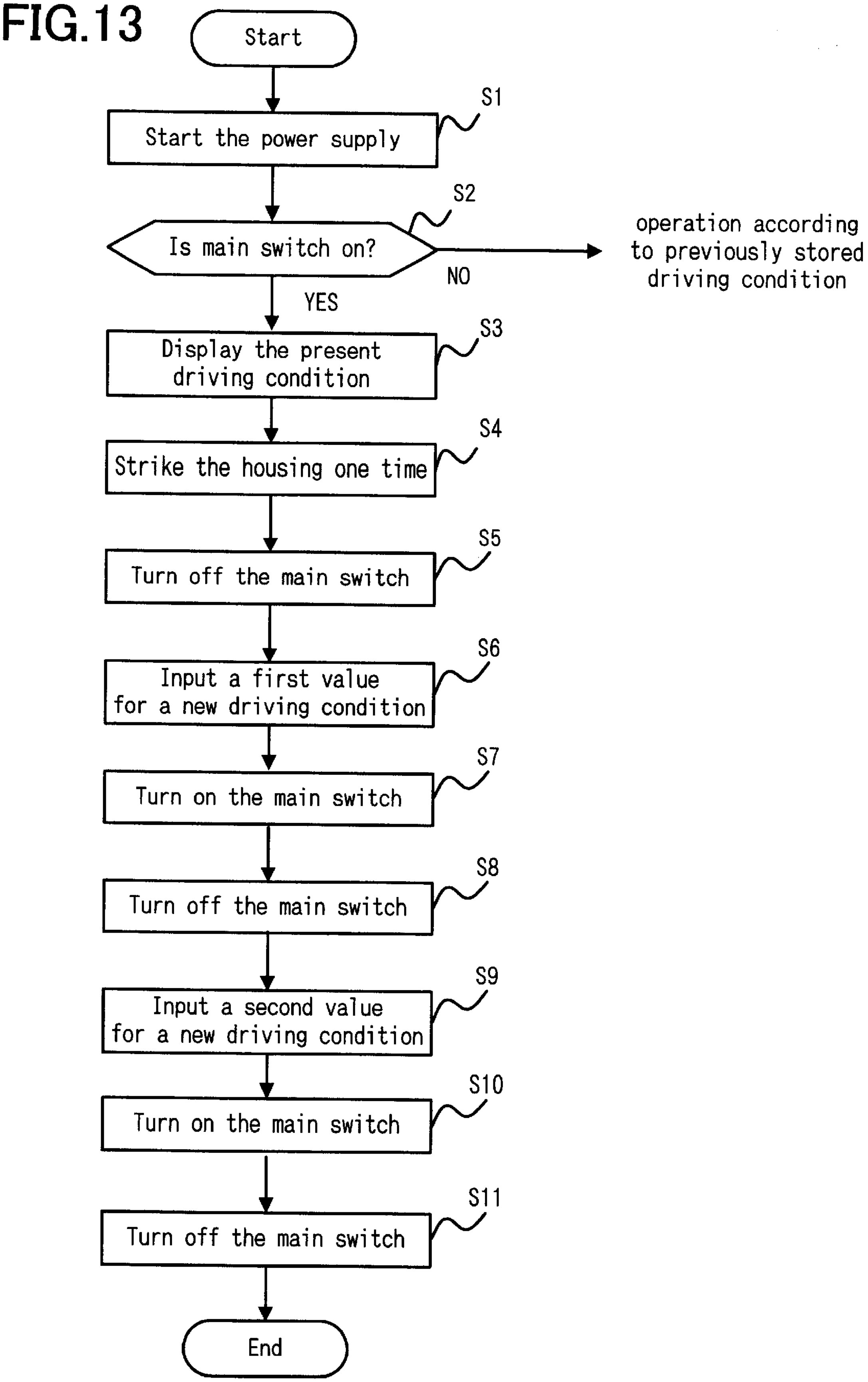
FIG. 13 shows a representative process for setting a driving (operating) condition.

Referring to FIG. 12, a representative control circuit preferably includes microcomputer 38, which may include CPU 110, a ROM 118, RAM 120 and input/output interface (I/O) 108. Preferably, these components are integrated on a single integrated circuit. ROM 118 stores a setting program for setting the driving condition and a control program for controlling the driving condition of the motor 22. A representative setting program and control program will explained below in further detail.

Receiver 30 is connected to one terminal of comparator 104 via filter 102. Voltage V3 from reference voltage generator 112 is inputted to the other terminal of comparator 104. An output signal V1 from comparator 104 is communicated to microcomputer 38. A battery 122 (e.g. rechargeable battery pack) is connected to microcomputer 38 via power supply circuit 130 and is also connected to motor 22 via main switch 48 and motor rotation direction switch 24. Motor 22 is connected to microcomputer 38 via driving circuit 115 and brake circuit 113. Red LED 39*a* and green LED 39*b* are also connected to microcomputer 38 via light circuits 124 and 126. Memory 128 is also connected to microcomputer 38.

When receiver 30 detects an impact sound, receiver 30 outputs a pulse signal to comparator 104. Filter 102 attenuates low frequency noise and supplies a filtered signal V2 to comparator 104, which then outputs a pulse signal V5 when the filtered signal V2 exceeds the reference voltage V3. Each pulse signal V5 is counted by microcomputer 38 and thus corresponds to the number of impact sounds that are detected by receiver 30.

A supervisor or other appropriate person may set the driving conditions, such as operation mode, predetermined impact number etc., which were described in the first representative embodiment in further detail. Therefore, these driving conditions need not be repeated and are instead incorporated into the second representative embodiment by reference. Motor 22 and LEDs 39*a* and 39*b* are controlled according to the set driving condition. A representative method for setting the driving condition for the second representative embodiment will be explained with reference to the flow chart of FIG. 13.

In order to set the driving condition, battery 122 is removed from tightening tool 1 and the power supply to microcomputer 38 is stopped, because the setting program is programmed to start the program at the time that battery 122 is re-coupled to the microprocessor. Therefore, it is necessary to start the power supply to the microcomputer 38 (step S1) in order for the microprocessor 38 to recognize the new driving condition.

When microcomputer 38 receives sufficient voltage to begin operation, the microcomputer 38 distinguishes whether the program for setting the driving condition has started (S2). For example, microcomputer 38 may determine whether a trigger signal has been communicated to I/O 108 by main switch 48. If main switch 48 has been turned off, i.e. "NO" in step S2, the setting program is not executed to input a new driving condition and motor 22, etc. are controlled according to a previously set driving (operating) condition.

If main switch 48 is turned on, i.e. "YES" in S2, the present set driving condition is displayed (S3). In this example, microcomputer 38 sends signals to green LED 39*b* and red LED 39*a* in order to light these devices a particular number of times. Similar to the first representative embodiment, the driving condition can be set and displayed using a double digit number. Thus, a hexadecimal number (one number from 0 to 9 or one letter from A to F) and a subordinate number (one number from 0 to 9) can be used to determine the driving condition. Therefore, microcomputer 38 displays the driving condition by flashing green LED 39*b* and red LED 39*a* an appropriate number of times. For example, if the predetermined number selected for the driving condition for the tightening tool is [xy], green LED39*b* may be lit "x+1" times and red LED 39*a* may be lit "y+1" times. The LEDs are lit one time more than x or y for the following reason. When a "0" is inputted at position [x] or [y] for the driving condition, LED39*a* or 39*b* would not light and thus, the driving condition might be misunderstood as a break down of the light. By adding [1] to the predetermined number, LEDs 39*a* and 39*b* will be lit even if x or y is "0." After the selected driving condition is displayed by red LED 39*a* and green LED 39*b*, both red LED39*a* and green LED39*b* are continuously lit.

In order to determine whether receiver 30 and microcomputer 38 are functioning properly, an impact sound test (S4) can be performed by striking the housing 3 once with a screwdriver or another appropriate object. If receiver 30 detects the impact sound, a pulse signal will be communicated to microcomputer 38. If microprocessor 38 properly detects this pulse signal, microcomputer 38 will turn off red LED 39*a* and green LED 39*b*, thereby indicating that the receiver 30 and microcomputer 38 are properly detecting impact sounds.

After red LED 39*a* and green LED 39*b* are turned off, main switch 48 is also turned off (S5). Thereafter, microcomputer 38 completes the preparation for setting a new driving condition, which can also be set by striking housing 3 with a screwdriver or other appropriate object (S6). For example, number [x] is first set by striking the housing 3 the appropriate [x] number of times. Receiver 30 detects the screwdriver impact sound, and a corresponding number of pulse signals are communicated to microcomputer 38. Therefore, the microcomputer 38 sets [x] according to the counted number of pulse signals. The microcomputer 38 then flashes green LED 39*b* with the counted number of pulse signals in order to permit the operator to confirm that the appropriate value has been entered.

After setting the appropriate value for [x], main switch 48 is turned on (S7) and is turned off again (S8). Then, microcomputer 38 lights green LED 39*b* to indicate that the subordinate figure can be set by striking the housing 3 a predetermined number of times. Similar to the above setting process, the housing 3 is struck [y] times in order to set the subordinate value (S9). Again, an appropriate number of pulse signals are generated by receiver 30 and comparator 104 and microcomputer 38 counts the received pulse signals in order to set the subordinate value. Thereafter, microprocessor 38 flashes red LED 39*a* in accordance with the counted number of pulse signals in order to confirm that the proper value has been entered.

After the subordinate figure has been set, main switch 48 is turned on (S10) and is turned off again (S11). Then, microcomputer 38 lights red LED 39*a* to indicate that the subordinate value has been input. Green LED 39*b* remains lit during process steps S9 to S11. Thus, when the new driving condition has been set, both red LED 39*a* and green LED 39*b* are lit. The number [xy] that indicates the driving condition is stored in memory 128 that is connected to the microcomputer 38 and used to control the operation of tightening tool 1.

Of course, each of the driving conditions described in the first representative embodiment may be utilized in the second representative embodiment and the description of the first representative embodiment is thus incorporated into the second representative embodiment by reference. Thus, modes A, B, C, D, E and F may be utilized in the second representative embodiment and each of the modes may be entered by striking tightening tool 1 an appropriate number of times.

Thus, in the second representative embodiment, a mechanical switch (e.g. a dial) is not provided to set the driving condition. The ordinal process starts the program for the driving condition (main switch 48 is turned on as soon as the power switch is turned on), and the detecting signal outputted from the receiver 30 is used to set the driving condition. Therefore, the process for starting the program that sets the driving condition may be controlled by a supervisor and changes to the driving (operating) condition by unauthorized operators can be avoided.

Because the process for starting the program that sets the driving condition is not usually set by operators (the main switch is turned on as soon as the battery pack is attached), inadvertent changes to the driving condition are avoided. Moreover, receiver 30 and main switch 48 have been utilized in known tightening tools and are available as hardware for setting the driving condition. Thus, no new hardware is necessary and manufacturing costs are not increased.

Naturally, red LED 39*a* and green LED 39*b* can be replaced with a display, such as a liquid crystal display and the various operating conditions or information can be communicated to the operator using text and/or numerals. Further, housing 3 of tightening tool 1 may be equipped with a special portion that the operator can strike in order to input information via receiver 30. The special portion may, for example, be a material that generates sound frequencies within a specified range that is easily and reliably detected by receiver 30. Also, the special portion may provide increased wear resistance, so that the housing is not broken or cracked by the operator striking the housing.

Third Detailed Representative Embodiment

A third representative embodiment of the present teachings is an angle socket driver. Such power tools are characterized by utilizing an oil pulse unit (oil unit) to generate a higher torque level, instead of a hammer and anvil structure. Generally speaking, the amount of torque generated by the oil pulse unit is less than the hammer and anvil structure, but many applications do not require such a high torque level. Also, the oil pulse unit does not generate as much noise and therefore can be operated more quietly. The oil unit also provides a compact design.

In the third representative embodiment, the driving condition (operation mode) can be set by transmitting or communicating data from a remote control device or other external device (i.e. operation condition setting device) to the power tool. Preferably, the remote control device is a radio control device that uses infrared or another radio frequency in order to transmit the data. However, the remote control device also could be an external device that is coupled to the power tool using a cable and the data is transmitted to and from the power tool using the cable.

Figure 14:
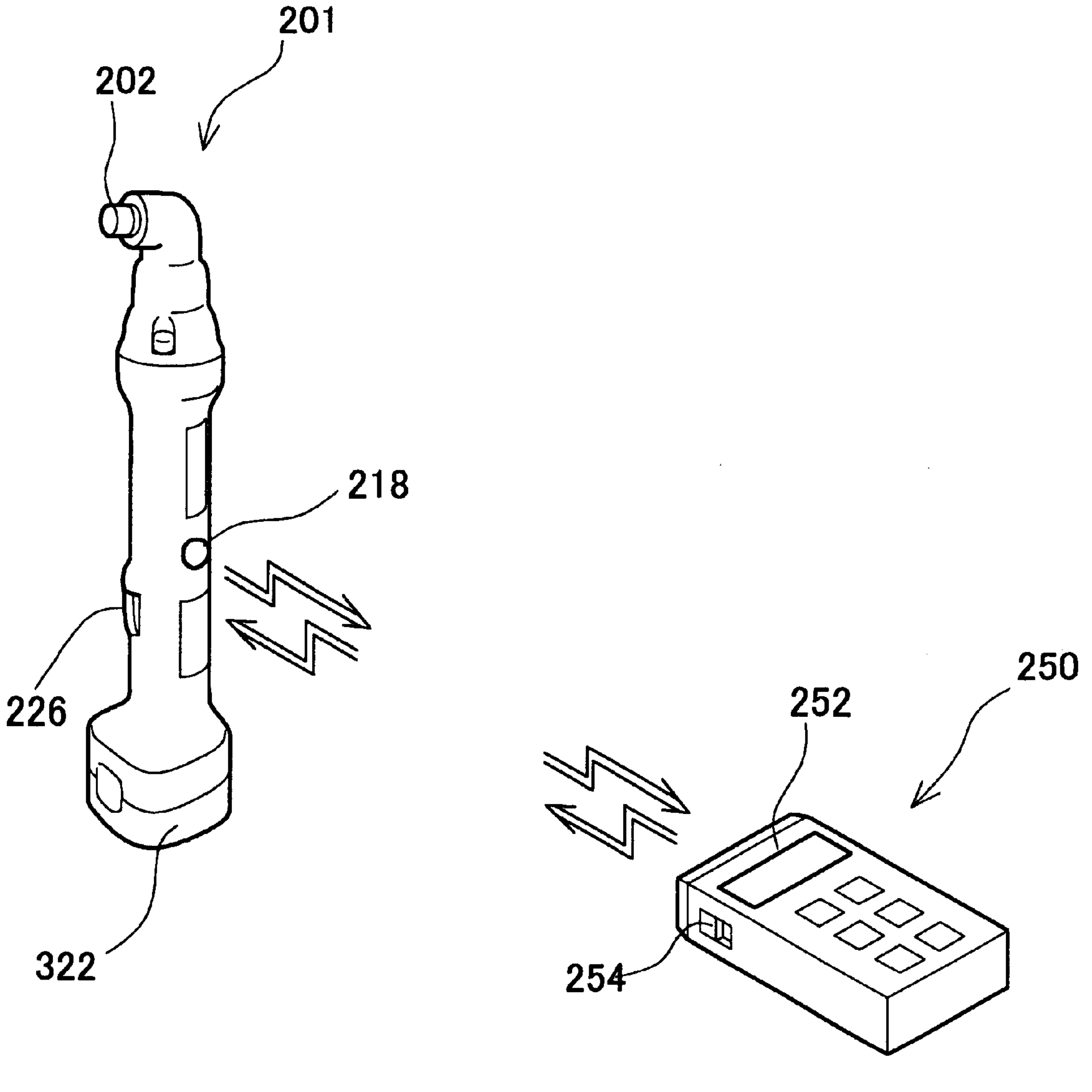
FIG. 14 is a view of angle socket driver and a remote control device according to a third representative embodiment of the present teachings.
Figure 15:
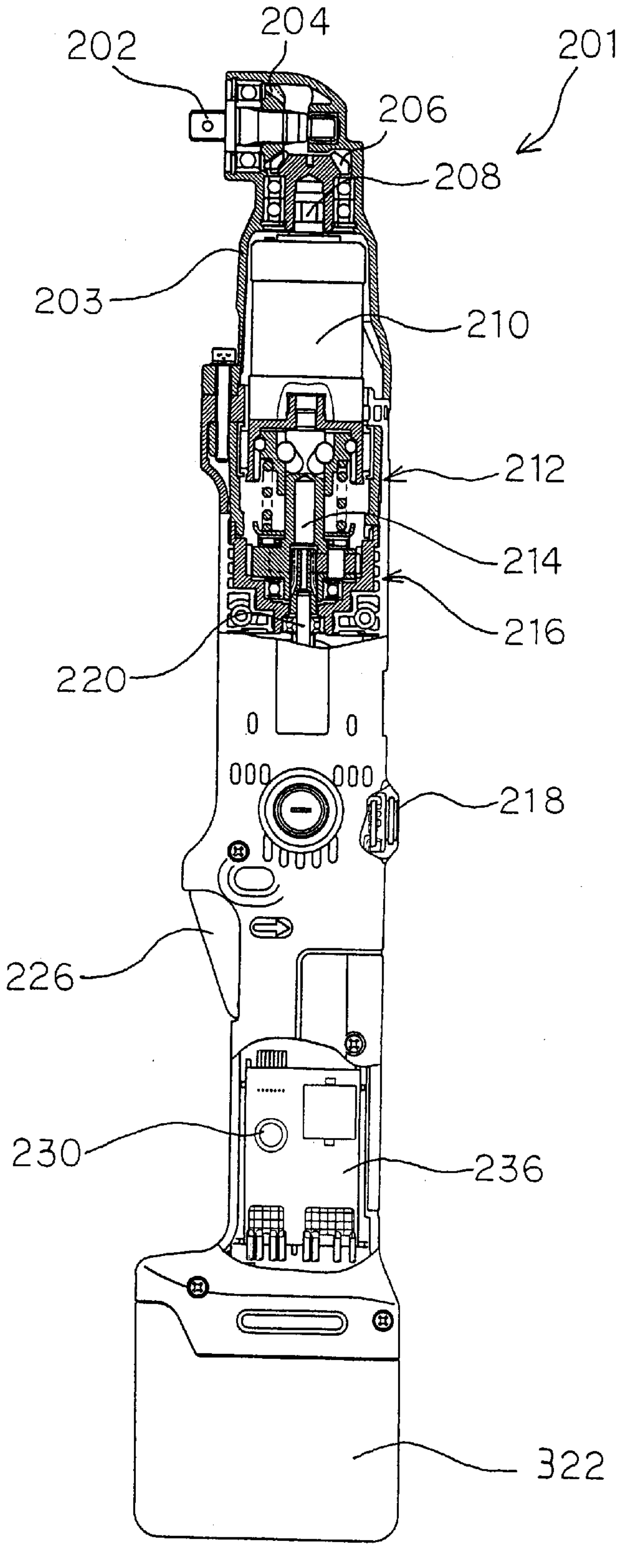
FIG. 15 is a side view, with parts broken away, of the angle socket driver of FIG. 14.

As shown in FIG. 14, angle socket driver 201 is shown and is generally utilized to tighten fastening devices, such as screws, nuts and bolts. Remote control device 250 may be utilized to set the driving condition for angle socket driver 201 and to transmit and receive other data. FIG. 15 shows a partial cross sectional side view of angle socket driver 201, in which a motor (not shown in FIG. 15 for purposes of clarity, but is identified by number 222 in FIG. 16) is fixedly accommodated within housing 203. Output shaft 220 of motor 222 is connected to a plurality of planet gears 216 and output shaft 214 is connected to oil (pulse) unit 210 in engagement with buffer mechanism 212. As described above, oil unit 210 is a device for generating an instantaneous driving torque (oil pulse) and buffer mechanism 212 prevents the impact from oil unit 210 from being transmitted to planet gears 216 when an instantaneous driving oil pulse is produced. A representative mechanism that may be utilized with the present teachings is disclosed in Japanese Laid-open Utility Model Publication No. 7-31281 in further detail.

The output shaft 208 of oil unit 210 is connected to first bevel gear 206. Bevel gear 206 engages second bevel gear 204, which is connected to spindle 202. Thus, bevel gear 204 is disposed substantially perpendicular to bevel gear 206 in order to transmit rotation of output shaft 208 to spindle 202. A tool bit (not shown for purposes of clarity) may be attached to the forward edge of spindle 202 in order to engage a fastening device, such as the head of a nut, bolt or screw.

Thus, the rotation of motor 222 is transmitted to oil unit 210 via planet gears 216. Because the load on spindle 202 is usually low in the initial stage of a tightening operation, the force generated by oil unit 210 is small. Therefore, an oil pulse is not generated and the motor rotation is continuously transmitted to spindle 202 via oil unit 210. However, after the fastening device has been substantially tightened, the load on spindle 202 increases and oil unit 210 generates oil pulses (impact forces) in order to firmly tighten the fastening device.

Figure 16:
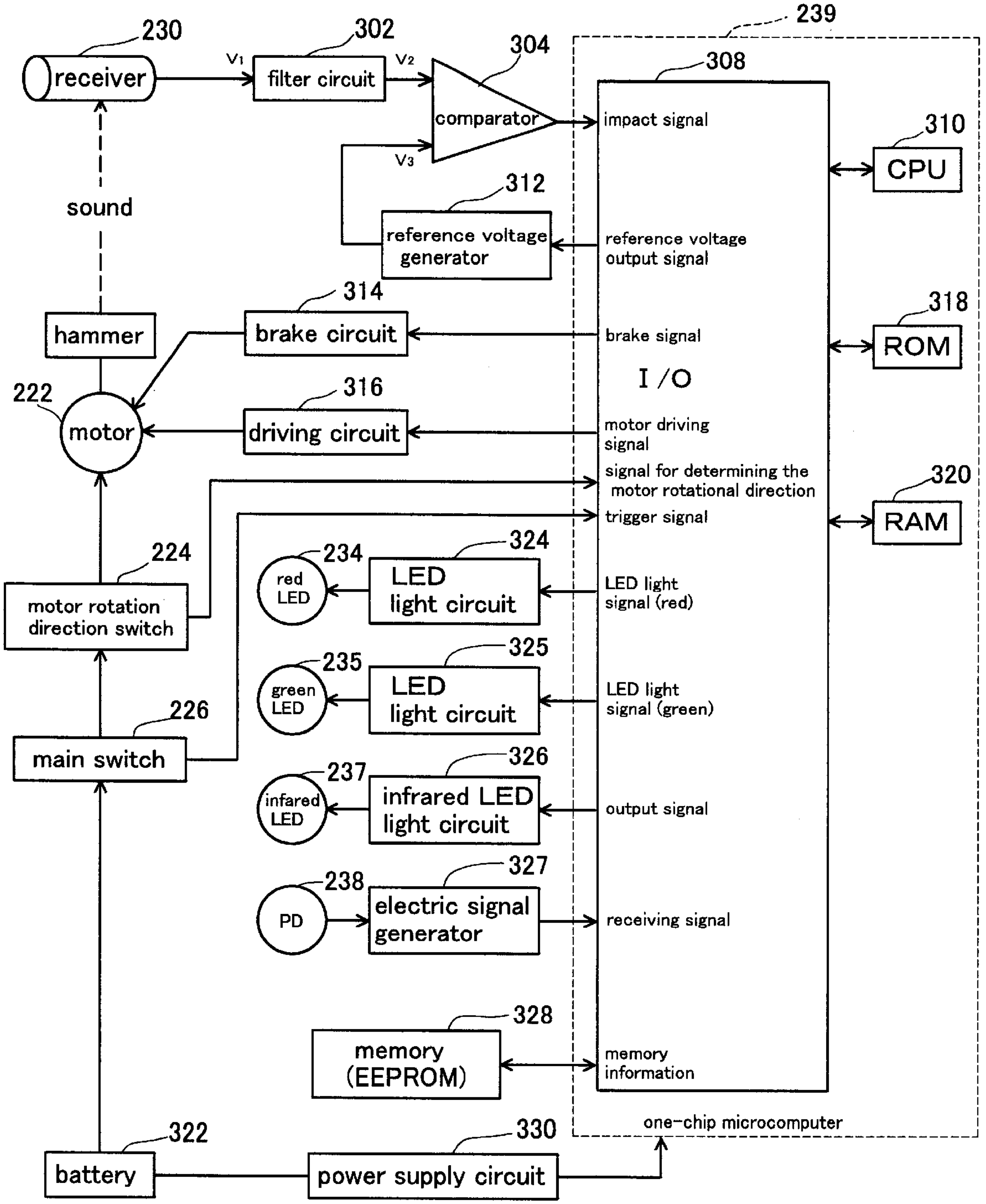
FIG. 16 is a block diagram showing a representative circuit for the third representative embodiment.

As shown in FIGS. 14 and 15, contact window 218 is disposed within the housing 203. As shown in FIG. 16, infrared LED 237 and photo diode 238 may be disposed proximally to contact window 218 in order to permit data communication with remote control device 250. Red LED 234 and green LED 235 are placed adjacent to infrared LED 237 and photo diode 238 in order to transmit information to the user, such as maintenance condition information, which will be described further below.

As shown in FIGS. 14 and 15, main switch 226 is mounted on housing 203 on the opposite side of contact window 218. Main switch 226 is preferably utilized to actuate (start and stop) motor 222. Control substrate 236 is mounted inside housing 203 and below main switch 226 and may include various components, such as microcomputer 239 and driving circuit 316. Receiver 230 (e.g. a condenser microphone) is mounted on control substrate 236 and is adapted to detect oil pulse sounds (impact sounds) generated by oil unit 210. Battery 322 is removably attached to the bottom portion of housing 203 in order to supply power to motor 222 and microcomputer 238. Battery 322 may of course be a rechargeable battery pack, as described in the previous embodiments.

As shown in FIG. 16, microcomputer 239 preferably includes CPU 310, ROM 318, RAM 320 and input/output (I/O) interface 308, which are preferably integrated onto a single integrated circuit chip. In addition to various programs discussed above, ROM 318 preferably stores a program that enables data communication with remote control device 250. In addition, ROM 318 may include a program that enables the operation mode (driving condition) for the angle socket driver 201 to be set. Further, a control program may be stored in ROM 318 that permits control of motor 222 in accordance with the operation mode.

Receiver 230 is coupled to one terminal of comparator 104 via a filter 302 and a reference voltage V3 from reference voltage generator 312 is inputted to the other terminal of comparator 304. An output voltage from comparator 304 is communicated to microcomputer 239. If receiver 230 detects an oil pulse (impact sound), receiver 230 generates a voltage V1 that is communicated to comparator 304 as filtered voltage V2. Preferably, filter 302 attenuates low frequency noise in voltage V1. Comparator 304 outputs a pulse signal when filtered voltage V2 exceeds reference voltage V3 and the number of pulse signals are counted by microcomputer 239. Naturally, the number of pulse signals counted by microcomputer 239 should correspond to the number of oil pulses (impact sounds) detected by receiver 230.

Battery 322 is connected to microcomputer 239 via power supply circuit 330. Battery 322 is also connected to motor 222 via main switch 226 and motor rotation direction switch 224. Motor 222 is connected to microcomputer 239 via driving circuit 316 and brake circuit 314. Red LED 234 and green LED 235 are connected to microcomputer 239 via light circuits 324 and 325. Infrared LED 237 is connected to microcomputer 239 via infrared LED light circuit 326 and photo diode 238 is also connected to microcomputer 239 via electric signal generator 327. Further, memory 328 is also connected to microcomputer 239 and memory 328 may be, for example, a re-programmable memory such as an electrically erasable programmable read only memory (EEPROM). Preferably, memory 328 stores data necessary to control angle socket driver 201, such as the operation mode, timer auto stop setting value, impact count auto stop setting value, etc.

Figure 18:
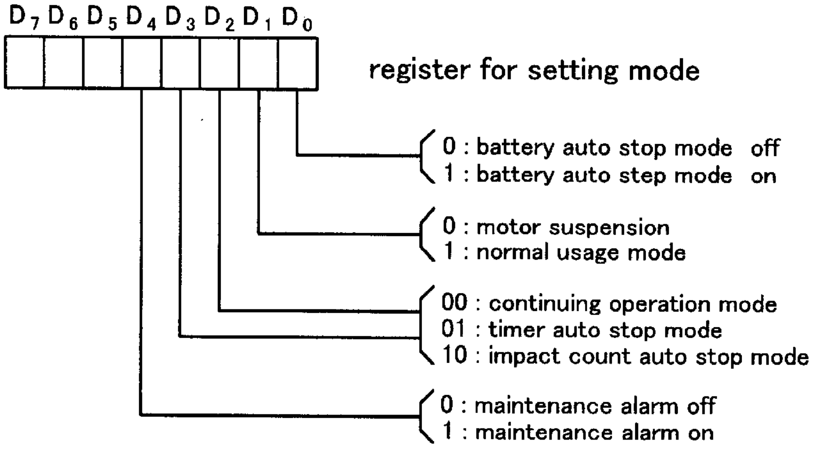
FIG. 18 is a representative memory structure for the setting mode register of FIG. 17.

FIG. 17 shows a representative memory structure for memory 328. FIG. 18 shows a representative register for setting the operation mode for angle socket driver 201. For example, memory 328 may utilize an 8-bit data structure (D0 to D7), although naturally other data structures (e.g. 4 bit, 16 bit, etc.) may be utilized. In a preferred embodiment, D0 may store data for the battery auto stop mode (off(0) or on(1)). D1 may store data for motor suspending mode (0) or normal mode(1). D2 and D3 may store data for modes, such as continuing operation mode (00), timer auto stop mode (01), impact count auto stop mode (10). D4 may store data for the maintenance alarm mode (off(0) or on(1)).

Herein, battery auto stop mode means an operation in which the battery voltage is checked and the voltage is compared to a set value to determine whether the battery voltage has fallen below a threshold level. Motor 222 may be automatically stopped (suspended operation), if the battery voltage is too low. Motor suspension mode means rotation of motor 222 is not permitted, even if main switch 226 has been actuated (turned on) in order to prevent an inadvertent operation and/or theft. Normal usage mode means motor 222 will rotate by actuating main switch 226.

Continuing operation mode means motor 222 will rotate continuously as long as main switch 226 is actuated. Timer auto stop mode means motor 222 is automatically stopped after a predetermined time has passed from the first oil pulse (i.e. the time that the first impact sound is detected by receiver 230). Impact count auto stop mode means motor 222 is stopped after a predetermined number of oil pulses have been generated (i.e. the predetermined number of impact sounds have been detected by the receiver 230).

Figure 19:
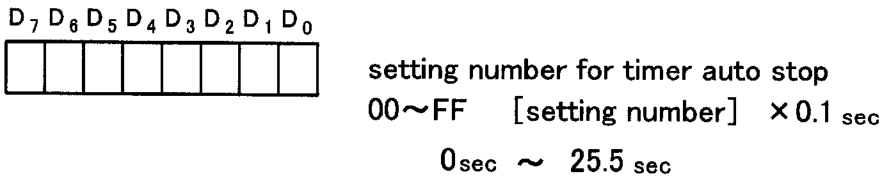
FIG. 19 is a representative memory structure for the timer auto stop mode register of FIG. 17.

The memory data for setting the predetermined time for suspending the motor 222 in the timer auto stop mode is also stored in memory 328. As shown in FIG. 19, the memory data preferably is 8 bit data that represents numerical values between 0 to 255. The suspending time for the motor 222 may be determined, for example, by multiplying the predetermined numerical value by 0.1 second.

Figure 20:
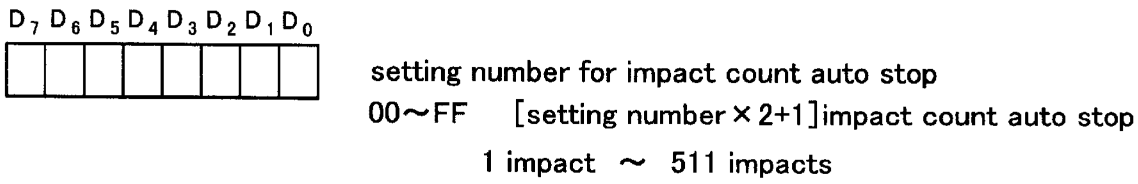
FIG. 20 is a representative memory structure for the impact count auto stop mode register of FIG. 17.

As shown in FIG. 20, the necessary predetermined number for impact count auto stop mode is stored in memory 328 as a value between 0 to 255 in a similar manner to the suspending time data. The actual number of impacts that are permitted before the motor 222 is automatically stopped can be determined by the equation:

$$A=2X-1,$$

wherein A is the actual number of impacts, and X is the predetermined numeral value stored in the registry shown in FIG. 20.

Referring back to FIG. 18, maintenance alarm mode means an alarm that is activated if the actual operation of angle socket driver 201 reaches a predetermined threshold in which maintenance is either recommended or required, which will be described further below. If the required maintenance condition has been reached, motor 222 is stopped (suspended) even if main switch 226 is actuated and the user can not use angle socket driver 201 until the required maintenance has been performed. If the maintenance alarm mode has been set, red LED 234 may be lit in order to inform the user that motor 222 will not operate until the maintenance has been performed. Again, red LED 234 and green LED 235 may be replaced with a display capable of displaying text and/or numerals, such as a liquid crystal display. Thus, such warnings may also be communicated to the operator using text and/or numerals.

Information concerning the actual operation and the predetermined maintenance alarm condition for angle socket driver 201 are stored in memory 328. In order to determine whether the maintenance alarm condition has been reached, the following representative conditions may be monitored:

- the number of times that main switch 226 has been operated,
- the number of times that battery 322 has been removed from angle socket driver 201,
- total number of hours of operation of motor 222,
- total number of hours of operation of gears 216 and/or
- total number of hours of operation of oil unit 210.

Naturally, other conditions may be monitored, if desired.

Data concerning each of these actual operating conditions and the predetermined level at which maintenance is recommended or required can be stored in various registers of memory 328, as shown for example in FIG. 17. These maintenance alarm conditions can be utilized to monitor the usage of various parts that may require replacement (e.g.

main switch 226, electric contact point for battery 322 and the tool body, motor 222, planet gear mechanism 216, oil unit 210). Thus, maintenance or replacement can be performed at an appropriate time. Naturally, each of the threshold levels may be set individually according to the expected endurance of each respective part. Thus, if a maintenance condition is reached for one of the parts, motor 222 may be stopped and the maintenance must be performed before the power tool can be used again.

In addition or in the alternative, the power tool may include a maintenance warning level. For example, when a particular maintenance condition is reached, the operator may be warned that a particular part is due for maintenance or replacement. However, the operator may continue to utilize the power tool after the warning has been given. This maintenance warning may be utilized by itself or may be combined with motor suspension, in which the motor will not operate until the maintenance is performed. Thus, the maintenance warning can be communicated at a first threshold level and the motor suspension may be executed at a second threshold level, wherein the second threshold level is higher than the first threshold level. In this case, the operator will be warned that a particular part requires maintenance when the first threshold level is reached. If the operator does not perform the required maintenance before the second threshold level is reached, the motor will be automatically suspended, so that the maintenance must be performed before the operator can utilize the power tool again. This operation will be described in further detail below with reference to FIGS. 26 and 32.

Referring back to FIG. 17, information necessary for remote control device 250 to recognize a particular angle socket driver 201 also may be stored in memory 328. For example, information concerning the model name or type and the serial number of the angle socket driver 201 can be stored in the memory 328.

Figure 21:
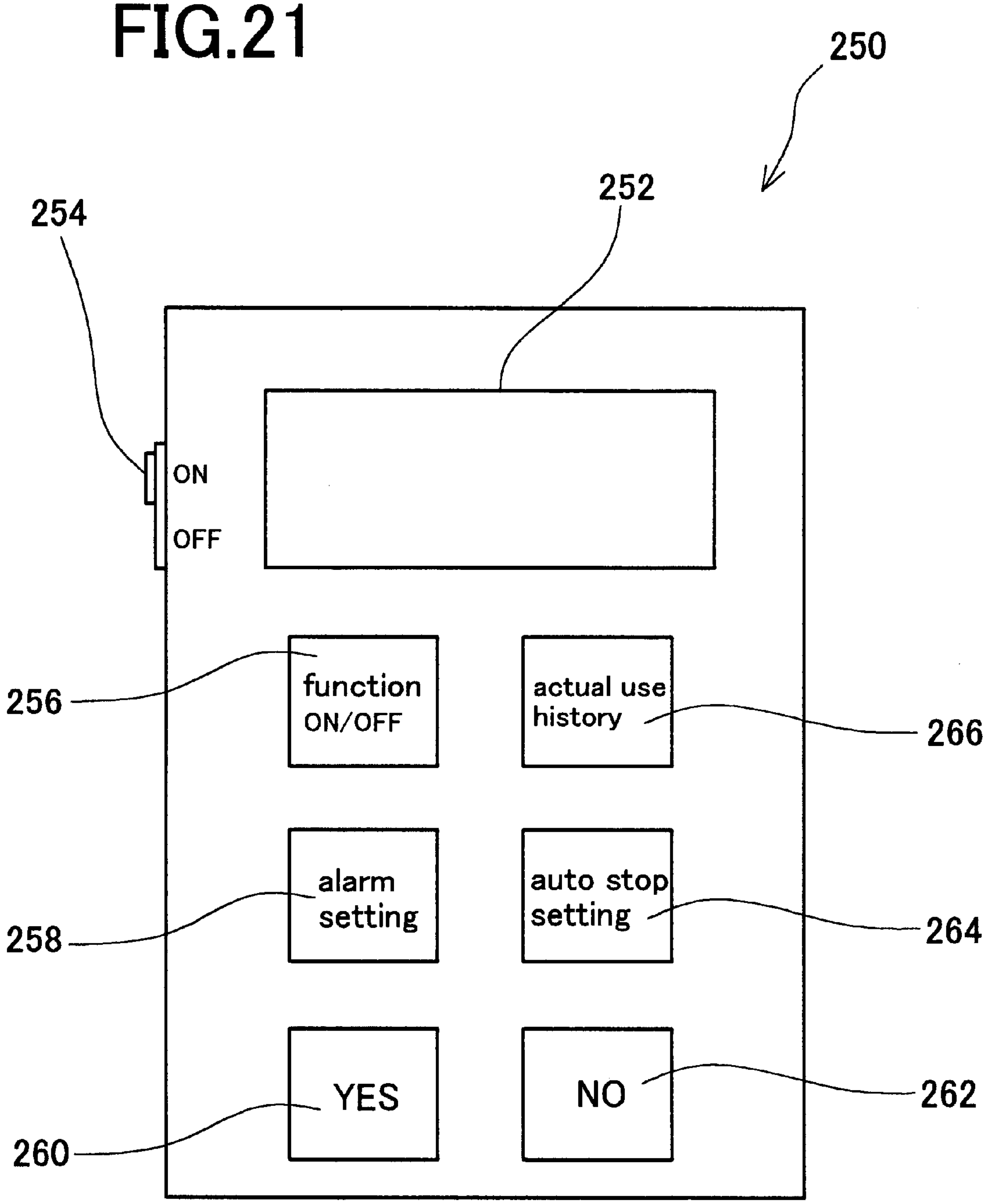
FIG. 21 is an external, front view of a representative remote control device that may be utilized, e.g. to program the third representative embodiment.
Figure 22:
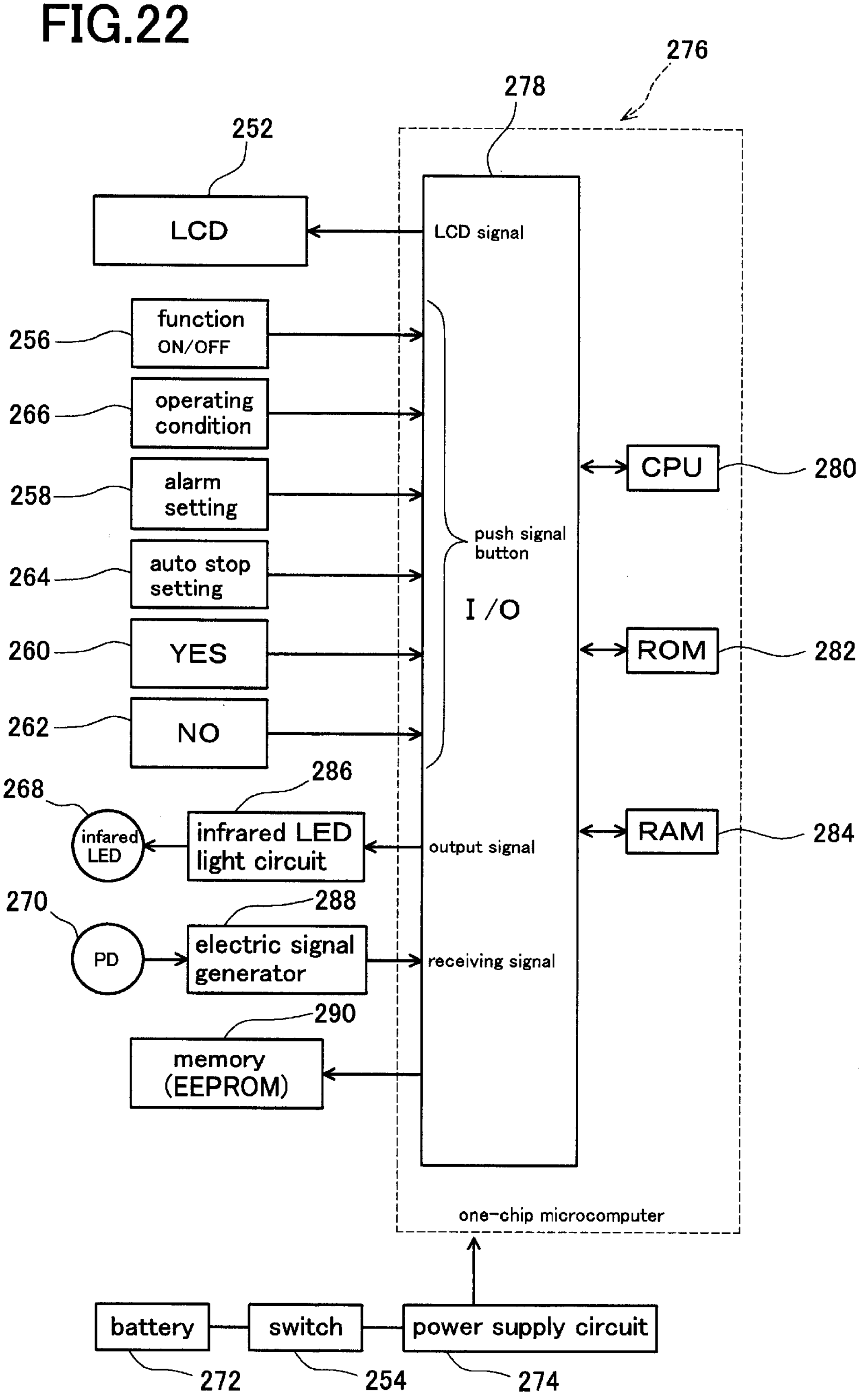
FIG. 22 is a block diagram showing a representative circuit for the remote control shown in FIG. 21.

A representative remote control device 250 is shown in FIGS. 21 and 22 and this remote control device 250 may be used to transmit/receive data to/from angle socket driver 201. As shown in FIG. 21, power switch 254 may be mounted on a side of remote control device 250. Further, various input switches, e.g. function ON/OFF switch 256, alarm setting switch 258, YES switch 260, NO switch 262, auto stop switch 264, actual use history switch 266 and display 252 are disposed on the front side of remote control device 250. Display 252 may be utilized to confirm information that has been input to screwdriver 201 and to view data received from screwdriver 201. Display 252 may preferably be a liquid crystal display (LCD), although various types of displays may be utilized with the present teachings.

FIG. 22 shows a representative control circuit for remote control device 250, which may primarily include microcomputer 276. Microcomputer 276 may include, e.g., CPU 280, ROM 282, RAM 284 and input/output interface (I/O) 278. Preferably, these components are integrated on a single chip, but these components may naturally be utilized separately. ROM 282 may store programs for communicating data to/from angle socket driver 201.

Signals from each of the above described input switches are coupled to microcomputer 276. Microcomputer 276 communicates information signals to display 252 in order to display the information. Infrared LED 268 is connected to the microcomputer 276 via an infrared LED lighting circuit 286 and photo diode 270 is connected via electric signal generator 288. Infrared LED 268 preferably generates infrared signals containing relevant data and these infrared signals are received by photo diode 238 in order to communicate data to angle socket driver 201. Photo diode 270 detects infrared signals transmitted by infrared LED 237 of impact screwdriver 201. Battery 272 can be mounted inside remote control device 250 for convenience and supplies power to microcomputer 276 via the power switch 254 and power circuit 274.

Memory 290 is connected to microcomputer 276 and memory 290 preferably stores setting data for each angle socket driver 201 that communicates with remote control device 250. Thus, memory 290 is preferably divided into several domains in order to store data for each respective angle socket driver 201 that communicates with remote control device 250. The data stored in each divided domain is basically the same data as that is stored in memory 328 of angle socket driver 201.

A representative method for using remote control device 250 to set the driving (operating) condition for angle socket driver 201 will now be explained. For example, a supervisor may utilize remote control device 250 in order to set the operation and auto stop mode for a plurality of angle socket drivers 250 and then each respective operator can use the angle socket driver 250. However, the present teachings also contemplate each operator utilizing the remote control device to set various operating modes and other conditions for the angle socket driver 250. Further, the operator (or a supervisor) may utilize the remote control device 250 in order to read information stored in memory 328 in order to determine the actual operating condition of the angle socket driver 201, such as total hours of usage for one or more parts. Finally, as noted above, the present embodiment utilizes infrared signals to communicate data between remote control device 250 and angle socket driver 201. However, other radio frequencies may be utilized. Moreover, a cable or other electrically conductive means may connect remote control device 250 and angle socket driver 201 and the data may be communicated via the electrically conductive means.

Figure 23:
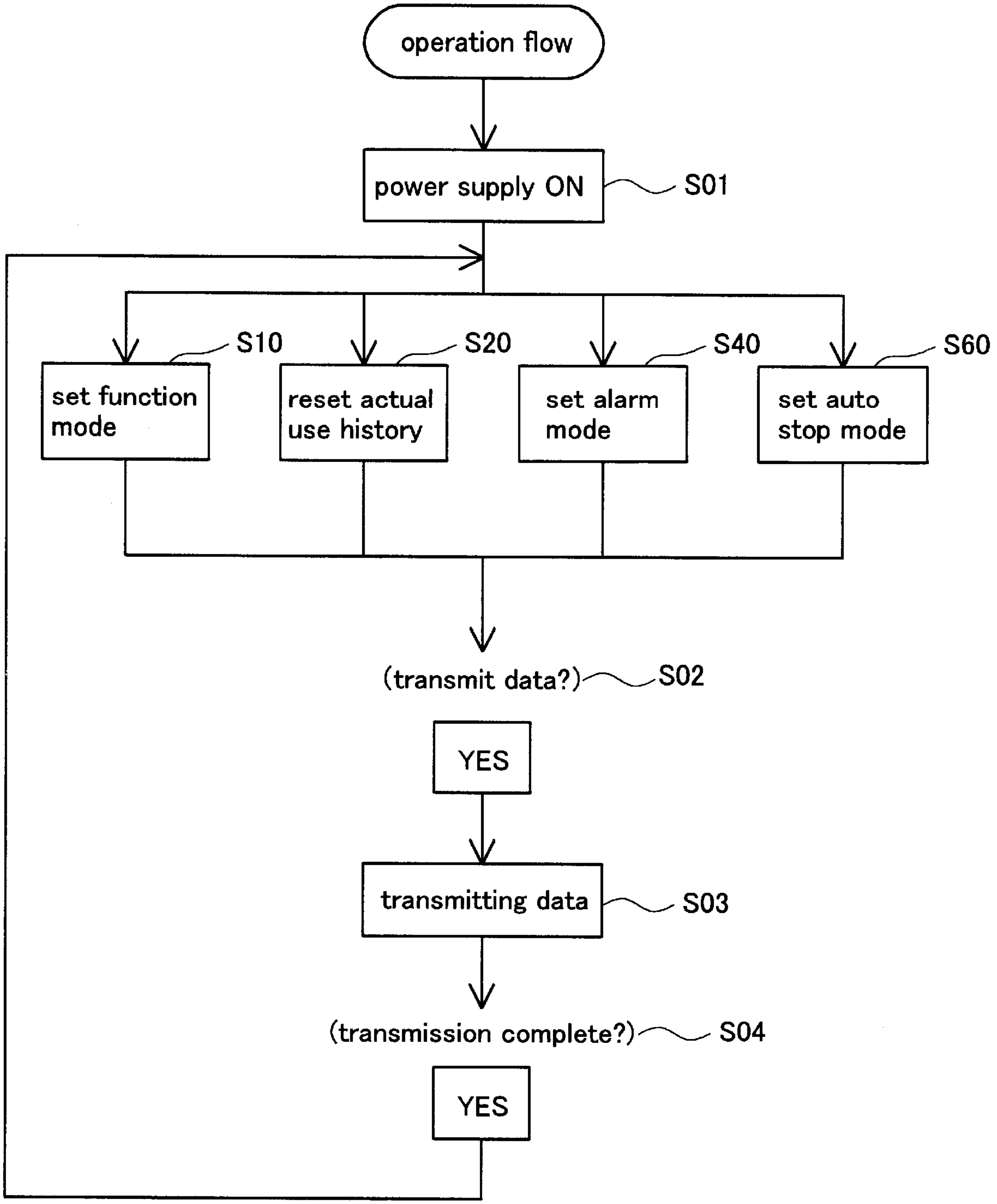
FIG. 23 shows a flowchart for setting various operating conditions using the remote control device of FIG. 21.

FIG. 23 shows a representative procedure for setting one or more modes using remote control device 250. First, power switch 254 is turned on (S01) and one of the functions is selected by pressing the appropriate input switch, i.e. ON/OFF switch 256 (S10), actual use history switch 266 (S20), alarm setting switch 258 (S40), auto stop switch 264 (S60). Each of these functions and a representative program for executing these functions will be provided below.

(1) Setting Operation Mode

Figure 24:
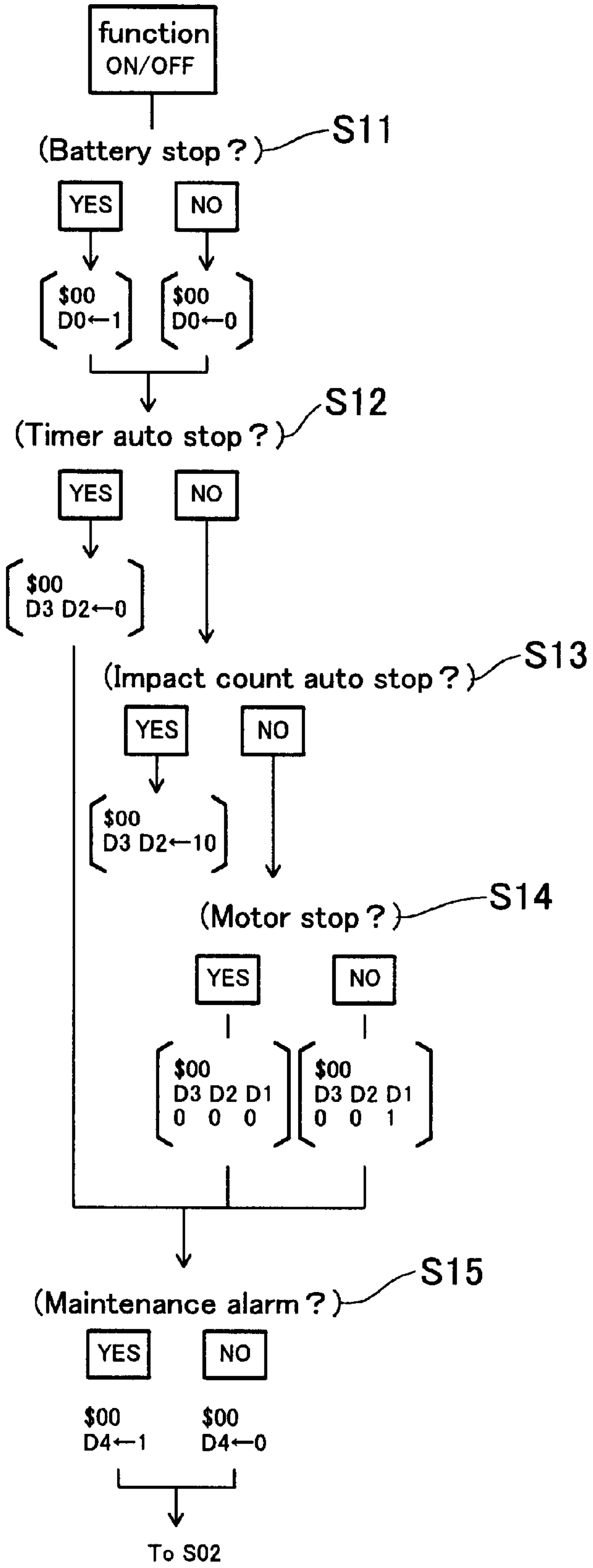
FIG. 24 shows a more detailed process for setting various operating conditions.

By selecting function ON/OFF switch 256, data to set one or more modes (functions), such as battery auto stop mode and timer auto stop mode, is transmitted to angle socket driver 201. A representative flowchart for the operation of function ON/OFF switch 256 is shown in FIG. 24. If function ON/OFF switch 256 is selected, the question "Battery stop?" is shown on display 252 (S11). If the battery auto stop mode is desired, YES switch 260 is pressed. If battery auto stop mode is not desired, NO switch 262 is pressed. By selecting YES switch 260, the value 1 (one) is set at D0 as shown in FIG. 18. By selecting NO switch 262, the value 0 (zero) is set at D0. The process then continues to step S12, in which the question "Timer auto stop?" is displayed on display 252. YES switch 260 is selected to turn ON the timer auto stop mode and NO switch 262 is selected to turn OFF the timer auto stop mode. If the YES switch is selected, the value (0,1) is set in D3, D2 and if NO switch 262 is selected, the value (0,0) is set as shown in FIG. 18.

The process then continues to step S13, in which display 252 shows the question "Impact count auto stop?" If YES switch 260 is selected the counter auto stop mode is turned ON and if NO switch 262 is selected, the counter auto stop mode is turned OFF. If YES switch 260 is selected, (1,0) are set in D3, D2 and the process will continue to step S15. If NO switch 262 is selected, the process continues to step S14.

In step S14, the display 252 shows the question "Motor stop?" If YES switch 260 is selected, the motor stop (suspension) mode is turned ON and if NO switch 262 is selected, the motor stop mode is turned OFF. If YES switch 260 is selected, (0,0,0) are set in D3, D2 and D1 in the register shown in FIG. 18. If NO switch 262 is selected, (0,0,1) are set in D3, D2 and D1 in the register shown in FIG. 18.

The process then continues to step S15, in which display 252 shows the question "Maintenance alarm?" If YES switch 260 is selected, the maintenance alarm mode is turned ON and if NO switch 262 is selected, the maintenance alarm mode is turned OFF. If YES switch 260 is selected, the value 1 is set in D4 as shown in FIG. 18 and if NO switch 262 is selected, the value 0 is set in D4.

By using this procedure, one bit of data is transmitted to instruct angle socket driver 201 as to whether certain operations (functions) are turned ON or OFF. A representative data transmitting process (step S03 in FIG. 23) will be described below.

(2) Re-setting Information Concerning Actual Use History

By selecting the actual use history switch 266, data is transmitted to reset information concerning the amount of actual operation that is stored in memory 328. Information, such as the number of times that main switch 226 has been actuated, the number of times that battery 322 has been detached from housing 203, etc., can be reset in memory 328. This function may be useful if maintenance is performed on the power tool and one or more parts are replaced. Because a new part has been put into the power tool, the information concerning the actual usage of that part should be reset to zero. For example, if main switch 226 and oil unit 10 are replaced with new parts, the information concerning the actual usage of main switch 226 and oil unit 10 should be reset to zero in memory 328. Thus, memory 328 will store accurate data concerning the actual usage of each particular part, regardless of whether certain parts have been replaced.

Figure 25:
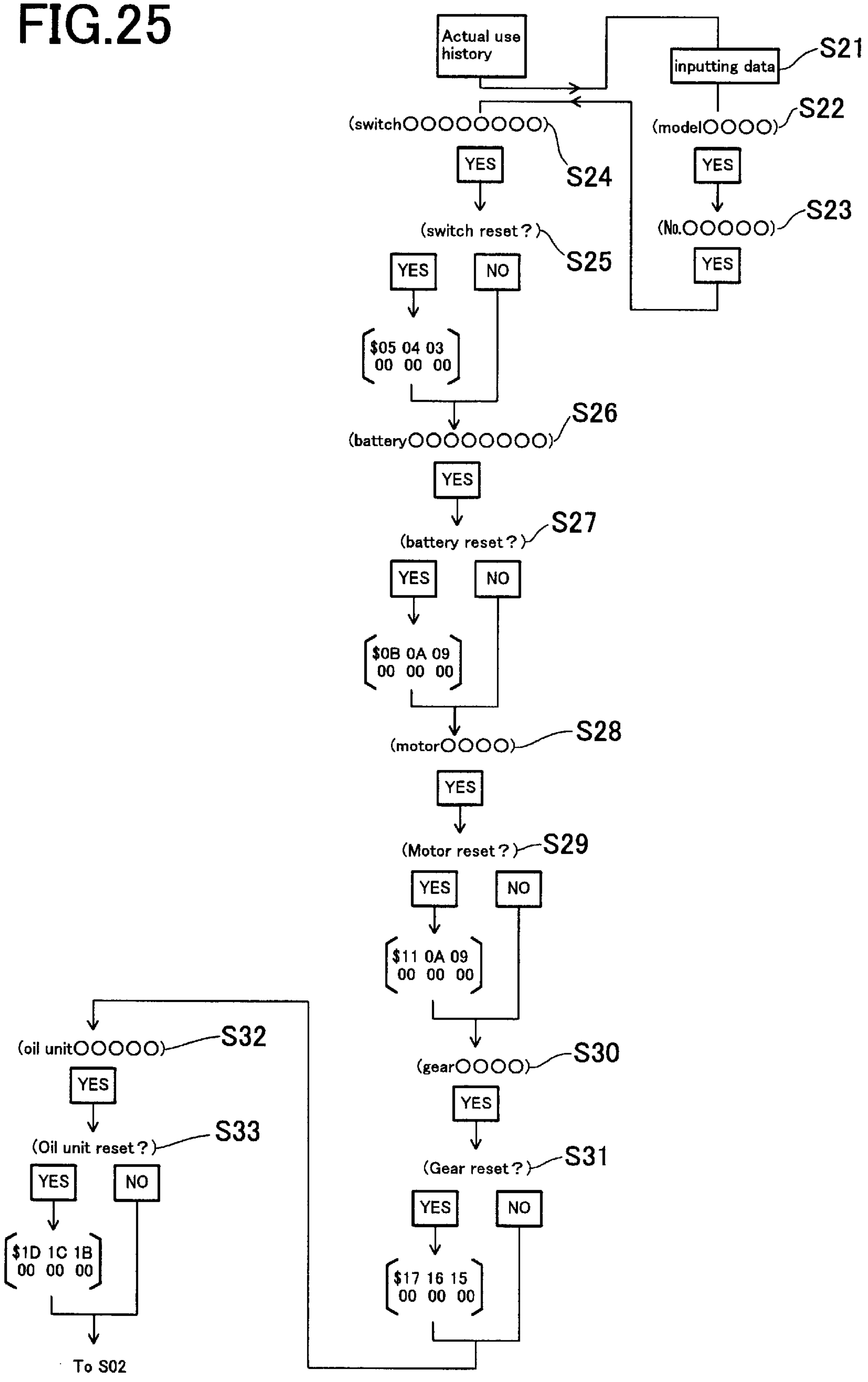
FIG. 25 shows a more detailed process for re-setting various stored values.

A representative method for resetting actual usage information will now be described with reference to FIG. 25. If actual use history switch 266 is selected, step S21 is executed and angle socket driver 201 transmits data concerning the model and serial number stored within memory 328. Display 252 will show identification information concerning the particular power tool (e.g. model name, serial number) in order to confirm that the actual use history will be changed for the correct power tool. If the correct model number is displayed in step 22, YES switch 260 is pushed. If the correct model number is not displayed, NO switch 262 is selected and the operator can locate another power tool. If YES switch 260 was pushed in response to step 22, the serial number of the power tool is next displayed. If display 252 shows the correct serial number in step S23, YES switch 260 is pushed. If the serial number is not correct, the correct power tool is located.

The information generated by step 22 and step 23 confirms that the correct angle socket driver 201 has been selected. Thereafter, angle socket driver 201 transmits information concerning the actual use history and microcomputer 276 receives this information. For example, angle socket driver 201 transmits data stored in memory 328 concerning the number of times that main switch 226 has been actuated. Then, display 252 shows "Switch 0000" (S24) and the viewer can confirm the actual number of times that main switch 226 has been actuated. YES switch 260 is selected to confirm that the viewer has seen the information and the process continues to step S25, in which display 252 indicates "Switch reset?" For example, if main switch 226 has been replaced during a maintenance operation, the actual use history data stored in memory 328 will be reset to "0" if YES switch 260 is selected. On the other hand, if main switch 226 has not been replaced, NO switch 262 is selected and the process continues the next step.

The same operation can be repeated for each of the parts for which memory 328 stores the actual use history. Thus, the following representative conditions can be reset:

- the number of times that battery 322 has been removed (S26 or S27),
- the actual hours of operation for motor 222 (S28 or S29),
- the actual hours of operation for certain gears, such as planet gear mechanism 216 (S30 or S31) and
- the actual hours of operation for oil unit 210 (S32 or S33).

Therefore, it is not necessary to repeat the detailed steps for each of these particular conditions, because the above-described steps may also be utilized for each of these conditions.

The above described transmitted data that is predetermined in the process is forwarded to the angle socket driver 201 with the data forward transmitting process (step S03 in FIG.16) in a similar way as the above described setting operation mode. The data forward transmitting process will be explained below.

(3) Changing Alarm Settings

Figure 26:
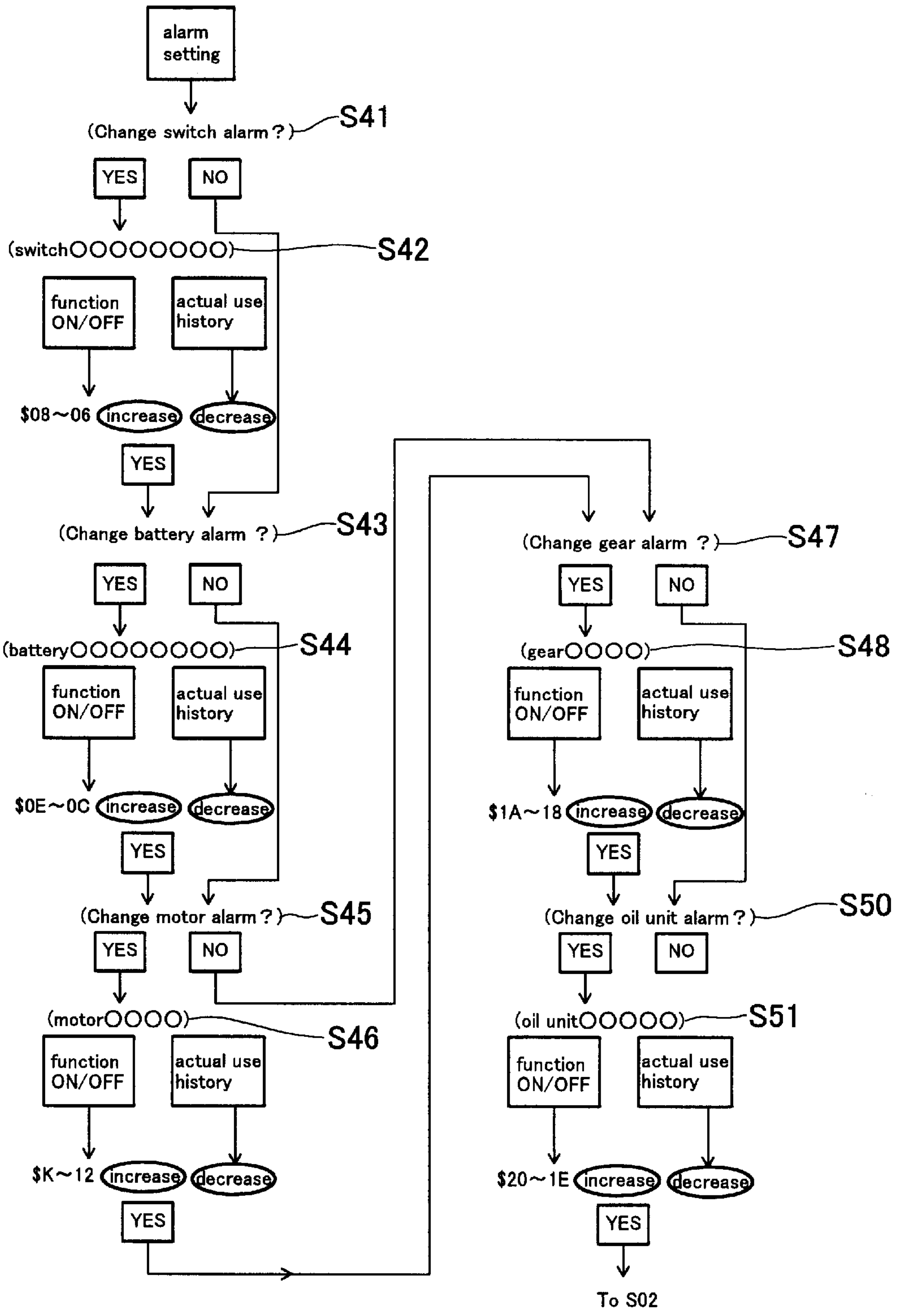
FIG. 26 shows a more detailed process for setting maintenance alarms.

Referring to FIG. 26, when the alarm set switch 258 is selected, data is transmitted to angle socket driver 201 to set the maintenance alarm conditions. At this time, the first question "Change switch alarm" is shown on display 252 (S41). If YES switch 260 is selected, display 252 shows "switch 0000" (542) (i.e. the current setting from the number of times that main switch 226 may be operated before the maintenance alarm will be given) and this value can be changed. If NO switch 262 is selected, the process proceeds to the step 543. The main switch maintenance alarm setting can be increased by pushing ON/OFF switch 256 and decreased by pushing actual use history switch 266. When the appropriate value has been selected, YES switch 260 is pushed and the process proceeds to step S43. Thereafter, the setting can be changed using steps S43–S46 for the numbers of times that battery 322 can be detached before the maintenance alarm is given. In a similar manner, the total hours of motor 222 operation before the maintenance alarm is given can be changed using steps S45–S46. Further, the total hours of gear operation, such as the planet gear mechanism 216, can be changed using steps S47–S48 and the total hours of oil unit 10 operation can be changed using steps S50–S51.

The data transmitted to the angle socket driver 201 for the alarm setting processes can be performed using the transmitting process (step S03) shown in FIG. 23, which will be further explained below.

(4) Changing Auto Stop Mode Settings

When auto stop switch 264 is selected, the data can be reset to change the number of hours of operation by motor 222 before motor 222 is automatically suspended (stopped) using the timer auto stop mode. Similarly, the impact number before automatic suspension (stoppage) of motor 222 can be changed using the impact count auto stop function.

Figure 27:
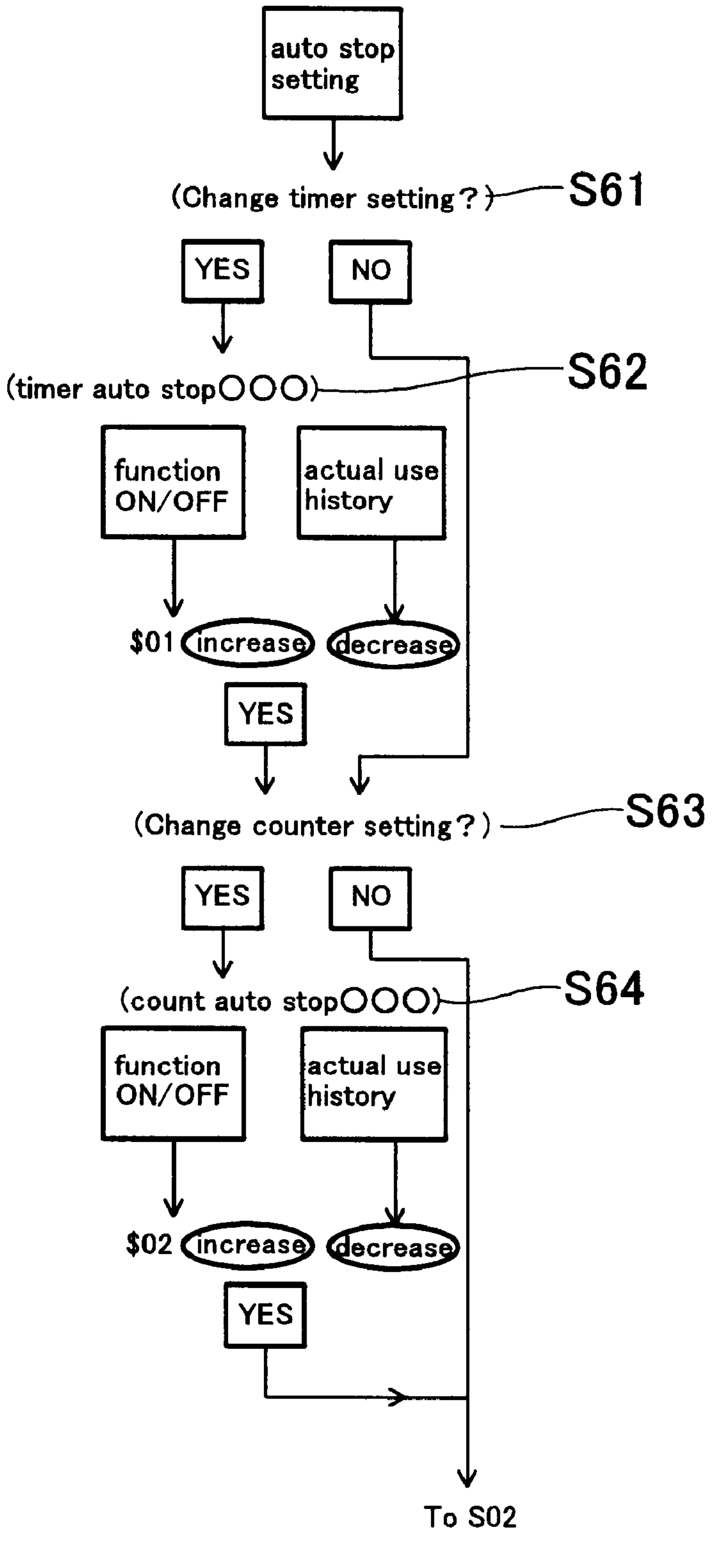
FIG. 27 shows a more detailed process for setting various auto stop conditions.

Referring to FIG. 27, when the auto stop switch 264 is selected, the question "Change timer setting?" is shown on display 252 (S61). If NO switch 262 is selected, the process proceeds to step S63. If YES switch 260 is selected, the display 252 shows "Timer auto stop 0000" (S62) in order to indicate the current setting for the number of hours of operation of motor 222 before motor 222 will be automatically stopped in order to perform maintenance. Thus, the number of operation hours can be increased by pushing ON/OFF switch 256 and can be decreased by pushing actual use history switch 266. After the desired number of hours has been selected, YES switch 260 is pushed and the process proceeds to step S63. The number of impacts can be reset using steps S63–S64 in a similar manner in order to reset the impact count auto stop function.

Again, the data transmitted to the angle socket driver 201 for the auto stop setting processes can be performed using the transmitting process (step S03) shown in FIG. 23, which will be explained now.

Referring back to FIG. 23, after the appropriate data has been selected in remote control device 250, the process proceeds to step S02 and display 252 will indicate the question "transmit data?" If YES switch 260 is selected, the data is communicated to angle socket driver 201 from remote control device 250 in step S03.

Figure 29:
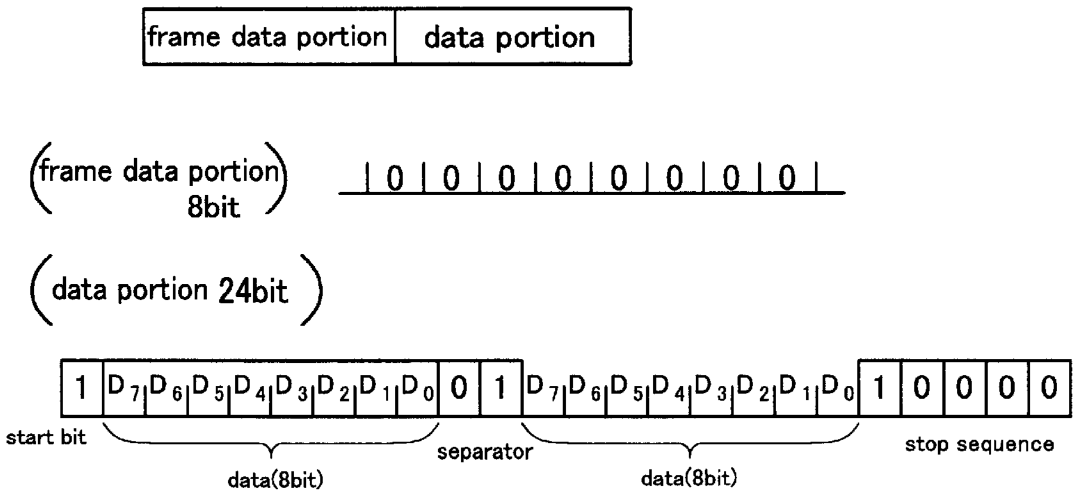
FIG. 29 shows a data structure for the transmitted data.
Figure 28:
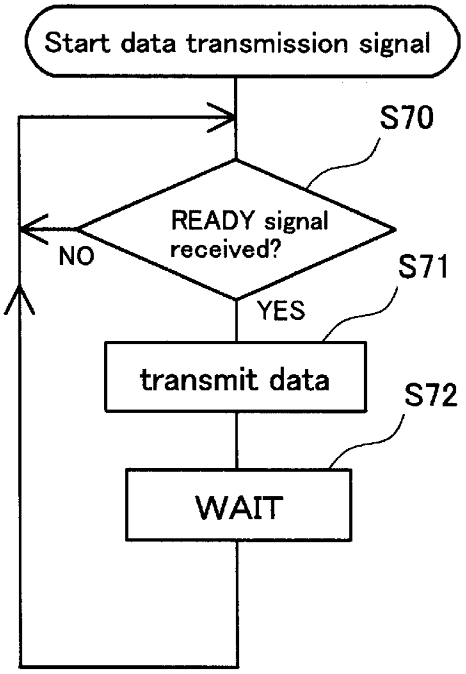
FIG. 28 shows a process for transmitting data from the remote control device to the power tool.

Referring to FIG. 28, a representative data transmitting process (S03) will be explained for remote control device 250 (transmitter) and angle socket driver 201 (receiver). After sending a start signal in order to start the transmission, the remote control 250 stands by until a READY signal is received from angle socket driver 201. After receiving the READY signal (YES in step S70), the process proceeds to the step S71 for the data transmitting process. As shown in FIG. 29, the data that is transmitted to angle socket driver 201 may preferably consist of a frame data portion (8 bit) and a data portion (24 bit). The frame data portion includes the data for the setting menu (e.g., setting program mode, resetting the actual use history, setting maintenance alarm mode, setting auto stop mode). The data portion (24 bit) may include a set of 8 bit data, which represents a new set of data that will be stored in memory 328, a separator (01) and a second set of the 8 bit data, which may be the same as the first set of 8 bit data. After the data transmission, the remote control 250 stands by (S72). If the transmitted data exceeds 1 byte (8 bits), the process after step S70 is repeated.

When all the data has been properly transmitted to angle socket driver 201, the process returns to step S04 shown in FIG. 23 and display 252 shows the question "Transmission complete?" If YES switch 260 is selected, data transmission to the angle socket driver 201 is completed. If another setting operation is necessary, the operator can push one of the buttons 256, 258, 264, 266 in order to return to step S10, S20, S40 or S60. Thereafter, another data transmission operation can be performed. The data transmitted to angle socket driver 201 is preferably stored in a particular address of memory 290 within remote control device 250.

Figure 30:
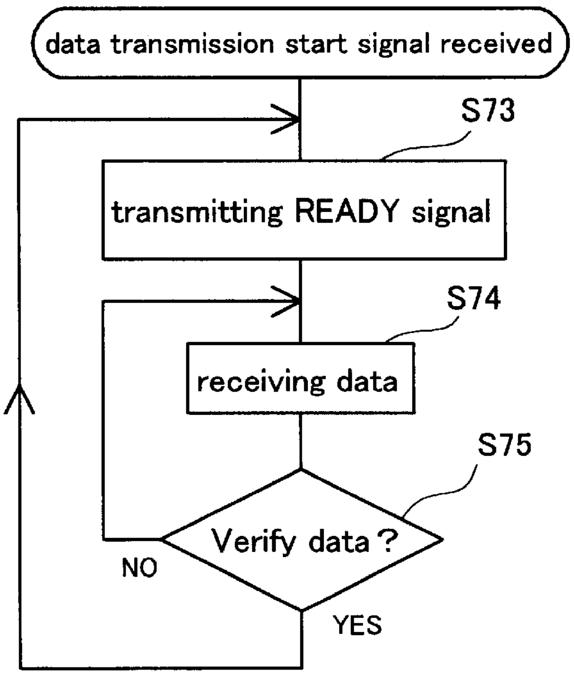
FIG. 30 shows a process for receiving data from the remote control device and processing the data within the power tool.

A representative program for transmitting and receiving data by angle socket driver 201 will be explained with reference to FIG. 30. After receiving a data transmission start signal from remote control device 250, angle socket driver 201 transmits the READY signal to remote control device 250 in step S73. After remote control device 250 receives the READY signal from angle socket driver 201, data is transmitted from remote control device 250 and angle socket driver 201 receives the transmitted data in step S74. Angle socket driver 201 then verifies whether the correct data has been received in step S75. For example, the verification can be performed by comparing the first set of 8 bit data to the second set of 8 bit data and determining whether the two sets are the same. If the correct data has been received the process returns to step S73. If received data is not correct (NO in step S74), the process after step S74 is repeated until the correct data is received. Memory 328 stores the received data and microcomputer 239 can utilize the new data to operate angle socket driver 201 according to operation mode that has been set using remote control device 250. In this embodiment, because the operation mode can only be changed using remote control device 250, which is separate from the tool body, the operating conditions can not be freely changed.

An optional modification of the third representative embodiment will now be described. For example, remote control device 250 may also include a program to determine whether a particular power tool is likely to reach a maintenance alarm threshold before the next scheduled check of the actual use history using remote control device 250. For example, the present power tools may be utilized in an assembly line situation and a single tool may be utilized substantially continuously for several hours at a time. In order to keep the assembly line moving efficiently, all the power tools should operate properly during the entire shift. If one power tool stops or requires repair during an assembly line shift, the operator must leave his/her position in the assembly line and possibly cause the assembly line to stop or slow down.

In order to avoid this potential problem, remote control device 250 includes a program that can check the current actual use history of the power tool. For example, the actual use history can be checked using remote control device 250 before a shift starts. The actual use history is transmitted to remote control device 250 and the program adds a predetermined amount of time (i.e. hours) or number of operations that is expected before the next expected check of the actual use history. For example, the actual use history may be checked again after the shift is completed, or may be checked at any other appropriate interval (e.g. daily, weekly, etc.). The program then compares the actual use history plus the expected use (until the next status check) to the maintenance alarm (or warning) setting. Therefore, remote control device 250 can determine whether the power tool is likely to reach the maintenance alarm level (or the maintenance warning level) before the next status check.

As a representative example, the current actual use history for the motor may be 1195 hours and the maintenance alarm level may be 1200 hours. Further, the expected motor use until the next status check is 6 hours. When remote control device 250 checks the motor usage (1195 hours) and adds the expected usage before the next status check (6 hours), remote control device 250 will warn the operator that the motor usage is expected to exceed the maintenance alarm level before the next status check. Therefore, the operator can service the power tool or select another power tool before beginning the shift and the assembly line will not be delayed due to a power tool reaching the maintenance alarm level during the shift.

Figure 31:
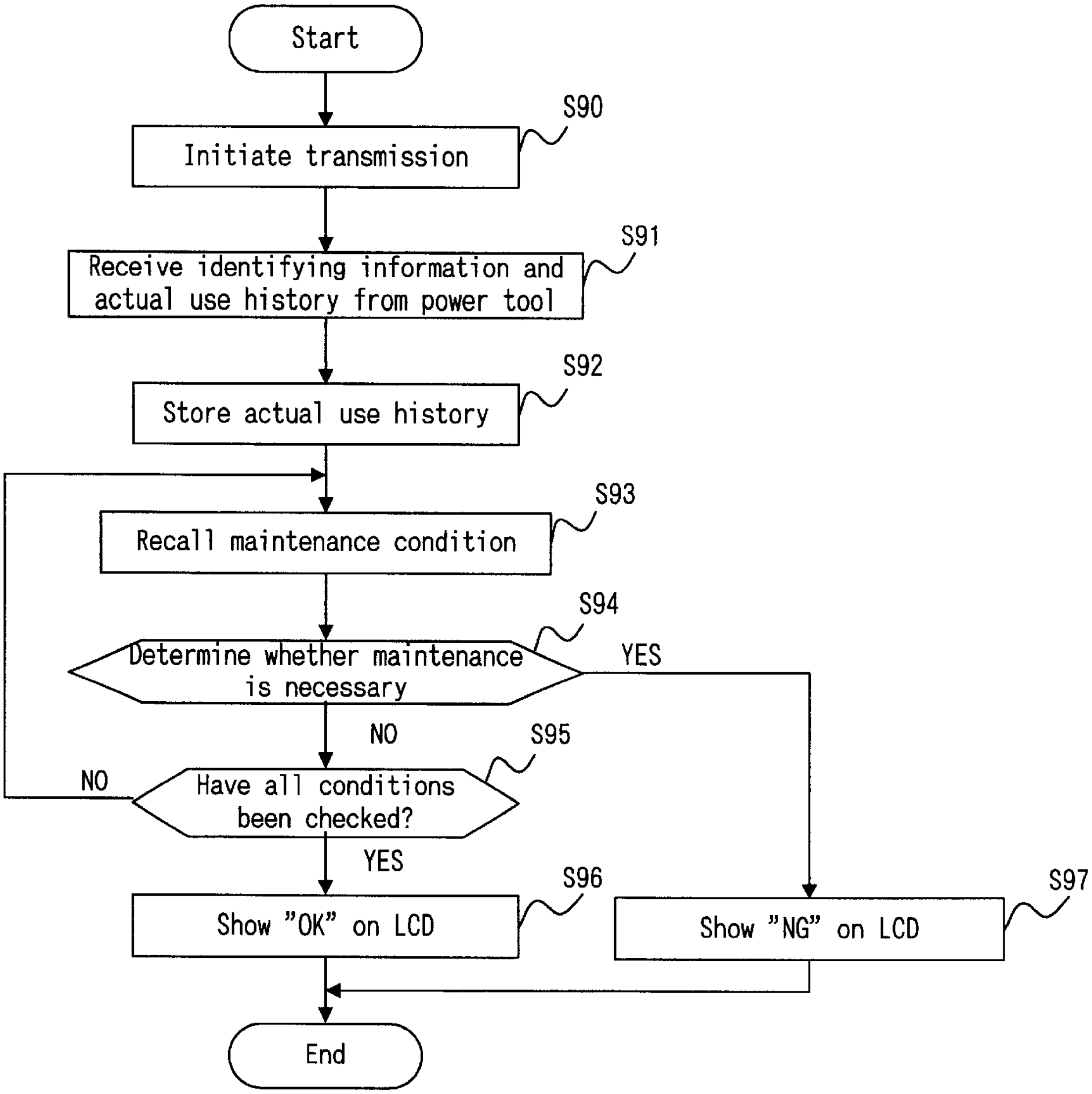
FIG. 31 shows a process for determining whether a maintenance warning level will be reached before the next scheduled status check.

Referring to FIG. 31, a program executed by the remote control device 250 during this status check operation is shown. In step S90, remote control device 250 initiates transmission with a particular power tool. As a result, the power tool communicates identifying information as well as actual use history information (S91). Remote control device 250 can then update its memory settings for the particular power tool and the new actual use history information (S92).

Remote control device 250 then performs the status check in order to determine whether a maintenance condition will arise in the next scheduled interval of use. The appropriate maintenance conditions are recalled (S93) from memory 290 and compared to the new actual use history information obtained from the power tool. In addition, remote control device 250 may add an appropriate amount to the actual use information in order to predict whether maintenance is necessary (S94). If maintenance is advised, the processes goes to step S97 and the display 252 may show "NG" (not good) or another appropriate warning to advise the operator that maintenance should be performed before utilizing the power tool again. If maintenance is not required based upon the particular actual use information that has been checked (NO in step S94), the process continues to step S95 in order to determine whether all maintenance conditions have been checked. If not, steps S93 and S94 are repeated for other types of actual use information. If all maintenance conditions have been checked, the display 252 indicates "OK" or another similar confirmation that the power tool can be utilized without performing maintenance.

Figure 32:
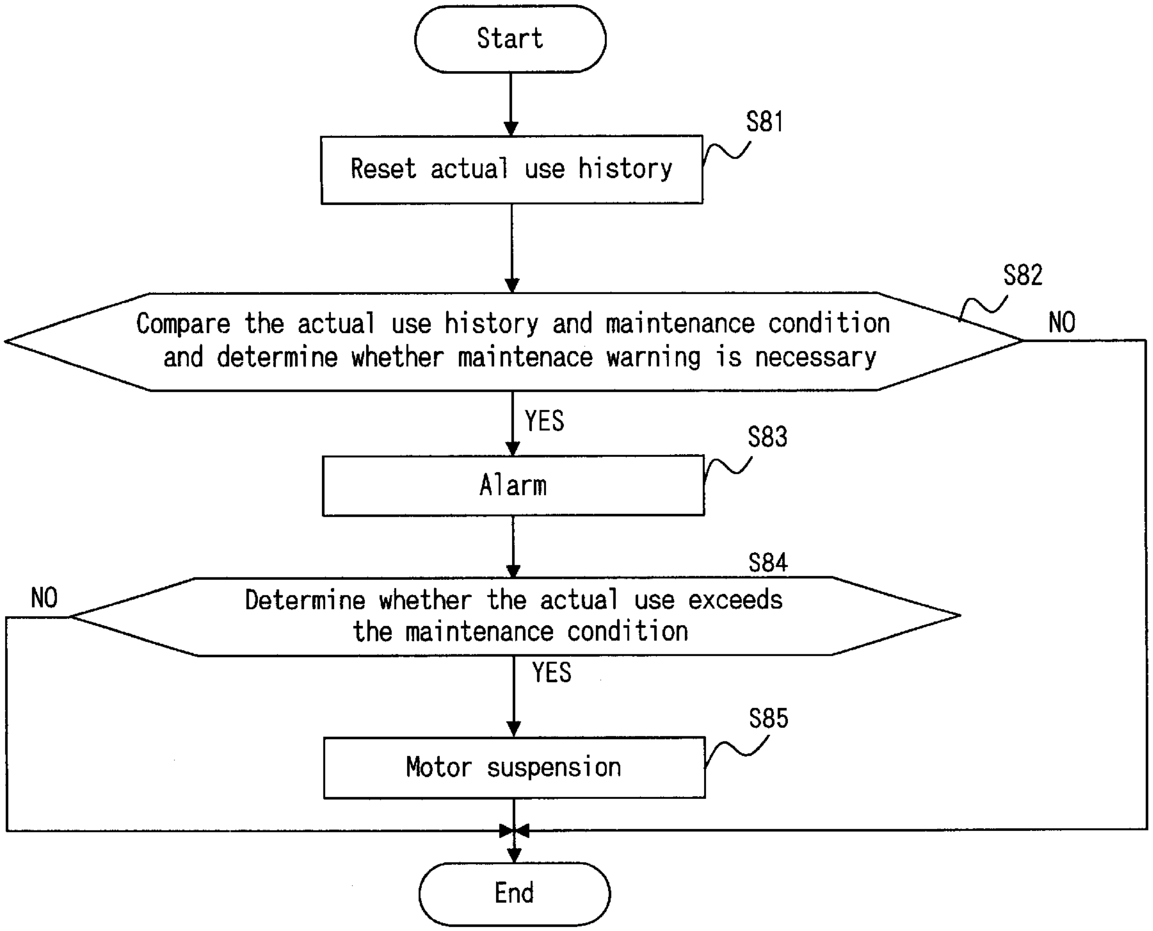
FIG. 32 shows a process for determining whether a maintenance warning should be given to the operator.

FIG. 32 shows a representative process that may be executed by microcomputer 239 during operation of power tool 201 in order to determine whether a maintenance warning level has been reached or whether a maintenance stoppage level has been reached. This process may be repeatedly performed during operation.

In step S81, the actual use history information is updated in memory 328. Thus, as the power tool is being used, the actual use data must be continuously updated, so that accurate information is stored in memory 328. Thereafter, the actual use data is compared to one or more pre-set maintenance condition levels (S82). In this embodiment, two maintenance levels are provided. If the first maintenance level is exceeded (YES in step S82), a maintenance alarm is provided (step S83). This maintenance alarm may be visual (e.g. LEDs or an LCD may display a visual warning) and/or audible (e.g., receiver 230 may emit a warning sound), as discussed further above. If the first maintenance level has not been reached, the program goes to the end.

In this embodiment, the operator is permitted to continue to operate the power tool, even after the first maintenance level is reached. However, after determining whether the first maintenance level has been reached, the power tool then determines whether a second, higher maintenance level has been reached (S84). If the higher maintenance level has been reached, motor 222 is suspended (stopped) and the operator is not permitted to operate the power tool until appropriate maintenance is performed (S85). If the second maintenance level has not be reached (NO in step S84), the process goes to the end. Naturally, this program may be modified in various ways without changing the substance of the desired results.

While this third representative embodiment has been described in terms of an angle socket driver, these teachings are naturally applicable to any type of power tool. Moreover, each of the driving conditions described in the first and second representative embodiments may be utilized in the third representative embodiment and the description of the first and second representative embodiments is thus incorporated into the third representative embodiment by reference. Thus, modes A, B, C, D, E and F may be utilized in the third representative embodiment and each of the modes may be entered using remote control device 250. Further, remote control device 250 may be another type of external device, such as a general or special purpose computer and the information may be transmitted to the power tool using a cable.

Throughout the text describing the representative embodiments, the term "microcomputer" has been utilized. However, those skilled in the art will recognize that a variety of control means may be utilized with the present teachings, such as a processor, a microprocessor, a general purpose processor, a specialized purpose processor and other state machines that have been appropriately designed.

U.S. Pat. No. 5,289,885 concerns a related technique for detecting impact sounds and controlling the motor based upon the detected impact sounds. This co-assigned patent is hereby incorporated by reference as if fully disclosed herein.

What is claimed is:

1. A power tool, comprising:

a tool, a motor drivingly coupled to the tool, a memory storing an operating program, identification information unique to the power tool, actual use information concerning at least one component of the power tool and first and second pre-set maintenance levels concerning said at least one component of the power tool, the second pre-set maintenance level being higher than the first pre-set maintenance level, means for wireless data communication with a remote control device, a processor in communication with the motor, memory and wireless data communication means, the processor operating the motor in accordance with the stored operating program and transmitting the power tool identification information to the remote control device upon receiving prompting from the remote control device, the processor also comparing the stored actual use information to the stored first and second pre-set maintenance levels and determining whether the first and second pre-set maintenance levels have been exceeded, means for warning the operator when the first pre-set maintenance level has been exceeded and means for disabling the motor when the second pre-set maintenance level has been exceeded in order to prevent further operation of the power tool until maintenance is performed on the power tool.

2. A power tool as in claim 1, further comprising:

means for generating an elevated torque coupled to the motor and the tool, wherein the generating means emits impact sounds when the elevated torque is generated, wherein the impact sounds fall within a narrow frequency range and means for detecting impact sounds within the narrow frequency range and for attenuating frequencies outside the narrow range.

3. A power tool as in claim 2, wherein the means for generating an elevated torque comprises an anvil and a hammer for impacting the anvil so that the anvil rotates and wherein the detecting means comprises a piezoelectric ceramic material.

4. A power tool as in claim 2, wherein the detecting means attenuates, by at least 50%, frequencies that are more than 10% lower or 10% higher than a peak frequency representative of the impact sounds.

5. A power tool as in claim 2, wherein the detecting means generates electric signals based upon detected impact sounds and the power tool further comprises:

means for comparing the level of the electric signals with a reference level, wherein the processor is programmed to count the number of impact sounds based upon the number of times that the electrical signals exceed the reference level and to control the motor in accordance with the counted number of impacts.

6. A power tool as in claim 1, wherein the processor is programmed to transmit the stored actual use information to the remote control device, upon prompting by the remote control device.

7. A power tool as in claim 1, wherein the processor is programmed to change the first and second pre-set maintenance levels upon receiving a new pre-set maintenance level from the remote control device.

8. A power tool as in claim 1, further comprising:

means for generating an elevated torque coupled to the motor and the tool, wherein the generating means emits impact sounds when the elevated torque is generated, wherein the impact sounds fall within a narrow frequency range and means for detecting impact sounds within the narrow frequency range and for attenuating frequencies outside the narrow range, the detecting means comprising a piezoelectric ceramic material, wherein the detecting means attenuates, by at least 50%, frequencies more than 10% lower or 10% higher than a peak frequency representative of the impact sounds and the detecting means generates electric signals representative of the impact sounds and means for comparing the level of the electric signals with a reference level, wherein the processor is programmed to count the number of impact sounds based upon the number of times that the electrical signals exceed the reference level and to control the motor in accordance with the counted number of impacts.

9. A power tool as in claim 1, wherein the operating program comprises instructions for adding a predetermined expected use to the actual use information stored in the memory, the predetermined expected use being representative of the expected usage of the power tool before a next scheduled check of the actual use information by the remote control device, the processor comparing the stored first maintenance level with the actual use information plus the expected use in order to determine whether the first maintenance level will be reached before the next scheduled check of the actual use information by the remote control device.

10. In combination:

a remote control device comprising a memory storing a first power tool identification information, a second power tool identification information and means for wireless data communication, a first power tool comprising a tool, a motor drivingly coupled to the tool, a memory storing an operating program and the first identification information, means for wireless data communication with the remote control device and a processor in communication with the motor, memory and wireless data communication means, the processor operating the motor in accordance with the stored operating program and transmitting the first identification information to the remote control device upon receiving prompting from the remote control device and a second power tool comprising a tool, a motor drivingly coupled to the tool, a memory storing an operating program and the second identification information, means for wireless data communication with the remote control device and a processor in communication with the motor, memory and wireless data communication means, the processor operating the motor in accordance with the stored operating program and transmitting the second identification information to the remote control device upon receiving prompting from the remote control device, wherein the remote control device is arranged and constructed to selectively communicate with the first and second power tools by means of the first and second identification information, respectively, wherein the first and second power tools each further comprise means for storing actual use information in the respective memories, means for warning the operator when a first maintenance level has been exceeded and means for disabling the motor when a second maintenance level has been exceeded, the disabling means preventing further operation of the power tool until maintenance is performed on the power tool, the first and second maintenance levels being stored in the memory, the second maintenance level being higher than the first maintenance level and the processor comparing the stored first and second stored maintenance levels with the actual use information stored in the memory.

11. A combination as in claim 10, wherein the first and second power tools each further comprise means for transmitting the stored actual use information to the remote control device, upon prompting by the remote control device, wherein the memory of the remote control device is configured to store the respective actual use information in respective registers corresponding to the first and second identification information.

12. A combination as in claim 11, wherein the first and second power tools each further comprise means for changing the first and second maintenance levels upon receiving a new maintenance level from the remote control device.

13. A combination as in claim 12, wherein the first and second power tools each further comprise:

means for generating an elevated torque coupled to the motor and the tool, wherein the generating means emits impact sounds when the elevated torque is generated, wherein the impact sounds fall within a narrow frequency range, means for detecting impact sounds within the narrow frequency range and for attenuating frequencies outside the narrow range, the detecting means comprising a piezoelectric ceramic material, wherein the detecting means attenuates, by at least 50%, frequencies more than 10% lower or 10% higher than a peak frequency representative of the impact sounds and the detecting means generates electric signals representative of the impact sounds and means for comparing the level of the electric signals with a reference level, wherein the processor is programmed to count the number of impact sounds based upon the number of times that the electrical signals exceed the reference level and to control the motor in accordance with the counted number of impacts.

14. A power tool as in claim 10, wherein the operating program comprises instructions for adding a predetermined expected use to the actual use information stored in the memory, the predetermined expected use being representative of the expected usage of the power tool before a next scheduled check of the actual use information by the remote control device, the processor comparing the stored first maintenance level with the actual use information plus the expected use in order to determine whether the first maintenance level will be reached before the next scheduled check of the actual use information by the remote control device.

15. A power tool, comprising:

a tool, a motor drivingly coupled to the tool, a memory storing an operating program, actual use information concerning at least one component of the power tool and first and second maintenance levels concerning said at least one component of the power tool, the second maintenance level being higher than the first maintenance level, a processor in communication with the motor and the memory, the processor operating the motor in accordance with the stored operating program, the processor also comparing the stored actual use information to the stored first and second pre-set maintenance levels and determining whether the first and second pre-set maintenance levels have been exceeded, means for warning the operator when the first pre-set maintenance level has been exceeded, and means for disabling the motor when the second pre-set maintenance level has been exceeded, the disabling means preventing further operation of the power tool until maintenance is performed on the power tool.

16. A power tool as in claim 15, wherein the processor is programmed to transmit the stored actual use information to a remote control device, upon prompting by the remote control device.

17. A power tool as in claim 16, wherein the processor is programmed to change the first and second pre-set maintenance levels upon receiving new pre-set maintenance levels from the remote control device.

18. A power tool as in claim 17, wherein the operating program comprises instructions for adding a predetermined expected use to the actual use information stored in the memory, the predetermined expected use being representative of the expected usage of the power tool before a next scheduled check of the actual use information by the remote control device, the processor comparing the stored first maintenance level with the actual use information plus the expected use in order to determine whether the first maintenance level will be reached before the next scheduled check of the actual use information by the remote control device.

19. A power tool as in claim 18, wherein the processor further comprises means for wireless communication with the remote control device.

* * * * *